(12) United States Patent
Kim

(10) Patent No.: US 6,567,368 B1
(45) Date of Patent: May 20, 2003

(54) OPTICAL RECORDING MEDIUM AND METHOD AND APPARATUS OF REPRODUCING THE SAME

(75) Inventor: Dae Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/330,132

(22) Filed: Jun. 11, 1999

(30) Foreign Application Priority Data

| Jun. 13, 1998 | (KR) | P98-22156 |
| Jul. 29, 1998 | (KR) | P98-30739 |
| Sep. 30, 1998 | (KR) | P98-41177 |

(51) Int. Cl.[7] .................................................. G11B 7/00
(52) U.S. Cl. ............................... 369/124.02; 369/59.23
(58) Field of Search ......................... 369/124.02, 44.36, 369/275.3, 275.4, 53.33, 59.12, 59.23, 40.01, 95

(56) References Cited

U.S. PATENT DOCUMENTS

| 5,684,783 A | 11/1997 | Horimal et al. | 369/124.02 |
| 6,233,214 B1 * | 5/2001 | Hayashi | 369/59.23 |

FOREIGN PATENT DOCUMENTS

| EP | 580876 A1 | 2/1994 |
| EP | 829855 A1 | 3/1998 |
| EP | 829856 A1 | 3/1998 |
| JP | 2172039 | 7/1990 |
| JP | 6044572 | 2/1994 |
| JP | 6150324 | 5/1994 |
| JP | 6150363 | 5/1994 |
| JP | 6282845 | 10/1994 |
| JP | 7057269 | 3/1995 |
| JP | 10079170 | 3/1998 |
| WO | WO9317417 | 9/1993 |

OTHER PUBLICATIONS

Korean Patent Office Action mailed Apr. 30, 2001.
Japanese Office Action mailed Mar. 3, 2001.

* cited by examiner

Primary Examiner—William Korzuch
Assistant Examiner—Kim-Kwok Chu
(74) Attorney, Agent, or Firm—Birch, Stewart, Kolasch & Birch, LLP

(57) ABSTRACT

An optical recording medium having an information recorded at a high density, and an optical reproducing method and apparatus for reproducing the optical recording medium. The optical recording medium is provided with an information recording face having an information recorded as pit trains and including a track having any one of concentric circle and spiral shape, wherein at least two pit trains are arranged adjacently to be reproduced by a single light beam. An information is stored in a dual or triple pit train shape, so that a recording density can be increased at least more than twice. When a total length of the dual pit is recorded as a single pit length, it has a changeability with the existent optical recording medium such as CD and DVD, etc.

34 Claims, 22 Drawing Sheets

(A)

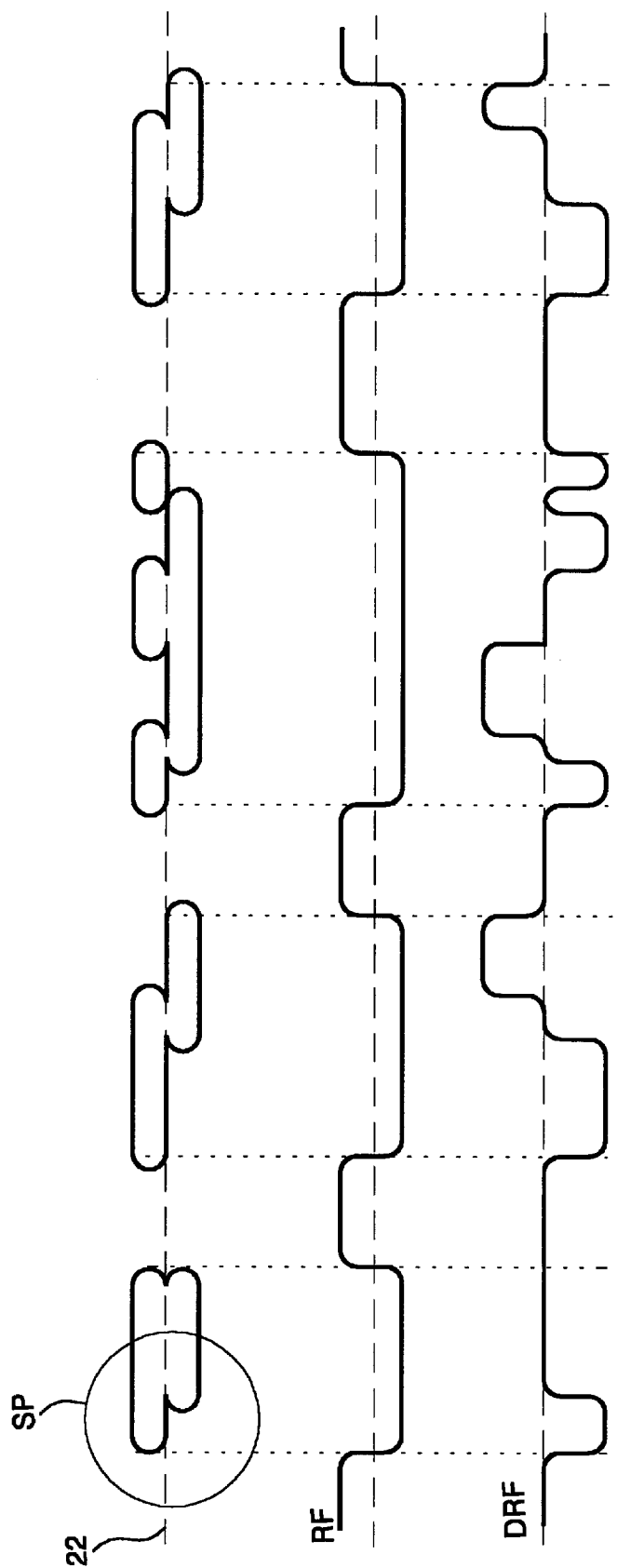

US 6,567,368 B1

OPTICAL RECORDING MEDIUM AND METHOD AND APPARATUS OF REPRODUCING THE SAME

BACKGROUND OF THE INVENTION

1. Field of the Invention

This invention relates to an optical recording medium for optically recording and reproducing various information signals such as image information, etc., and more particularly to an optical recording medium on which an information is recorded at a high density. Also, the present invention is directed to a method and apparatus of reproducing an information recorded on the high-density recording medium.

2. Description of the Related Art

Recently, an optical recording medium and an electromagnetic recording medium and so forth has been commercially available as an information recording medium for recording various information such as audio and video information, etc. In the optical recording medium, there have been propagated or developed a read-only type disc such as CD-ROM and DVD-ROM including a existent CD (compact disc), a WROM (write once read many) type disc such as CD-R (recordable) and DVD-R, etc., and a rewritable disc such as CD-RW (rewritable) and DVD-RAM, etc.

In such an optical recording medium, the read-only type disc has the structure consisting of a transparent substrates which is usually made from polycarbonate, etc. and has an information recorded on one face thereof, a reflective film which is deposited on the information recording face of the transparent substrate and is made from an aluminum material with a high reflectivity, and a protective layer which is formed on the reflective film and is made from a plastic material, etc. On the information recording face of the transparent substrate an information is recorded in a form of recording mark, for example, pit train with a concave and convex shape. In other words, as shown in FIG. 1, an optical recording medium 10 stores an information in a pit train shape 12 which makes a track extended from the inner circumference into the outer circumference in a spiral or concentric circle shape.

An information recorded on the optical recording medium in this manner is reproduced by means of an optical pickup for irradiating a light beam onto a track to be reproduced through the transparent substrate and detecting a reflective light amount. In this case, a reflective light reflected from a mirror 12B between pits 21A is detected into "brightness" while a reflective light reflected from the pit 12A is detected into "darkness". This is caused by a fact that a light beam irradiated onto the mirror 12B transmits the mirror 12B and is full-reflected by the reflective film while a light beam irradiated onto the pit 12A is diffused-reflected by the pit 12A to reduce a reflectivity. The reflective light beam detected into "brightness" or "darkness" is converted into a shape of electrical signal by means of a photo detector and then is signal-processed such that it is reproduced into an information in a shape of channel bit stream. This reproduction mechanism has been similarly applied to a phase change opto-magnetic recording system besides a recording method according to the pit train 12.

Referring to FIG. 2, there is shown a procedure of a recording and reproducing method for the conventional optical recording medium. When an information is recorded on the recording medium, in step 1, a user data to be recorded is added with an error correction code (ECC) for a predetermined block unit and divided into a sector unit, whereby it is converted into a shape of data channel. In step 2, the data channel is modulated and is added with a synchronizing signal in the frame unit to thereby be converted into a shape of channel bit stream (CBS). Then, in step 3, the channel bit stream is light-modulated and applied to the light source of the optical pickup. In step 4, the light source irradiates a recorded light beam according to a recorded data light-modulated and inputted to record an information in a shape of pit train 12 as shown in FIG. 3. The above-mentioned recording process is similarly applied to a disc fabrication process employing an exposure device in the case of a recordable optical recording medium as well as a read-only type optical recording medium (i.e., ROM type disc).

On the other hand, when an information recorded on the optical recording medium shown in FIG. 3 is reproduced, in step 5, a reproduced light beam from the light source is irradiated to trace a track defined by the pit train of the optical recording medium 10. As shown in FIG. 3, A light amount reflected from the optical recording medium 10 is detected and converted into an electrical signal to thereby detect a reproduced signal, that is, a radio frequency (RF) signal. In this case, the radio frequency signal RF has a low level at the pit 12A while having a high level at the mirror 12B. In step 6, such a radio frequency signal is equalized and sliced such that it is converted into a shape of channel bit stream CBS as shown in FIG. 3. The channel bit stream CBS is demodulated into a data channel shape in step 7 and processes an error correction code included in the data channel in step 8, thereby reproducing a user data recorded on the optical recording medium.

In an optical recording medium having such a recording and reproducing mechanism, there has been attempted various schemes for enhancing a recording density in accordance with an increased requirement intended to record a high capacity of information such as a moving picture, etc. More specifically, in the case of a CD and a DVD, there has been attempted a scheme of reducing a recording mark or a size of pit, or reducing a track pitch so as to enhance a recording density. To this end, there has been developed techniques of making use of a short wavelength of light source to enlarge the number of aperture of the objective lens and reduce a spot size of light beam. However, since reducing a spot size of light beam has a limit ultimately, reducing a pit size and a track space must be limited.

For example, a read-only type optical recording medium is fabricated by preparing an circular plate of a disc defined with a desired pit using an exposure device and making a inversive transcription of the pit formed in the circular plate to prepare a stamper, and thereafter by duplicating the disc, that is, molding a disc substrate using the stamper. In recent, it becomes possible to form minute pit in accordance with a development of argon (Ar) laser, etc. In a reproducing apparatus, however, there has not yet been a light source corresponding to the minute pit. As a result, since a pit size and a track pitch should be limited within a range that can be read by the reproducing apparatus, it has a limit to enlarge a capacity of the read-only type optical recording medium.

SUMMARY OF THE INVENTION

Accordingly, it is an object of the present invention to provide an optical recording medium that is capable of enlarging a recording density.

Further object of the present invention is to provide an optical recording medium that can enhance a recording density and have a changeablity with the existent recording media such as CD, DVD and so forth.

Still further object of the present invention is to provide an optical reproducing method and apparatus for reproducing an information recorded on the above-mentioned optical recording medium.

Still further object of the present invention is to provide an optical reproducing method and apparatus that can reproduce an information recorded at a high density using a relatively long wavelength of light source.

Still further object of the present invention is to provide an optical reproducing method and apparatus that can reproduce an information recorded on tracks by a long wavelength of light source when the tracks have been formed in correspondence with a short wavelength of light source.

In order to achieve these and other objects of the invention, an optical recording medium according to one aspect of the present invention includes a substrate; and an information recording face having an information recorded as pit trains and consisting of a track having any one of a concentric circle and spiral shape, wherein at least two pit trains are arranged adjacently in such a manner to be reproduced by a single light beam.

An optical reproducing method according to another aspect of the present invention includes the steps of irradiating a single light beam onto at least two tracks with respect to an optical recording medium having a track in which an information is recorded as pit trains; detecting and converting a reflective light from the optical recording medium using a photo detector divided into a plurality number, and combining the converted light detecting signals to thereby detect a plurality of radio frequency signals; and processing the plurality of radio frequency signals to detect information corresponding to each of said at least two tracks.

An optical reproducing apparatus according to still another aspect of the present invention includes light beam generating means for irradiating a single light beam onto at least two tracks with respect to an optical recording medium having a track in which an information is recorded as pit trains; signal detecting means for dividing a light reflected from the optical recording medium into a plurality number and detecting and converting the same, and combining the converted light detecting signals to thereby detect a plurality of radio frequency signals; and means for processing the plurality of radio frequency signals to detect information corresponding to each of said at least two tracks.

BRIEF DESCRIPTION OF THE DRAWINGS

These and other objects of the invention will be apparent from the following detailed description of the embodiments of the present invention with reference to the accompanying drawings, in which:

FIG. 19 is waveform diagrams representing signals outputted from the signal detector shown in FIG. 5 when the pit width satisfies the condition shown in FIG. 18;

DETAILED DESCRIPTION OF THE PREFERRED EMBODIMENTS

Figure 1:
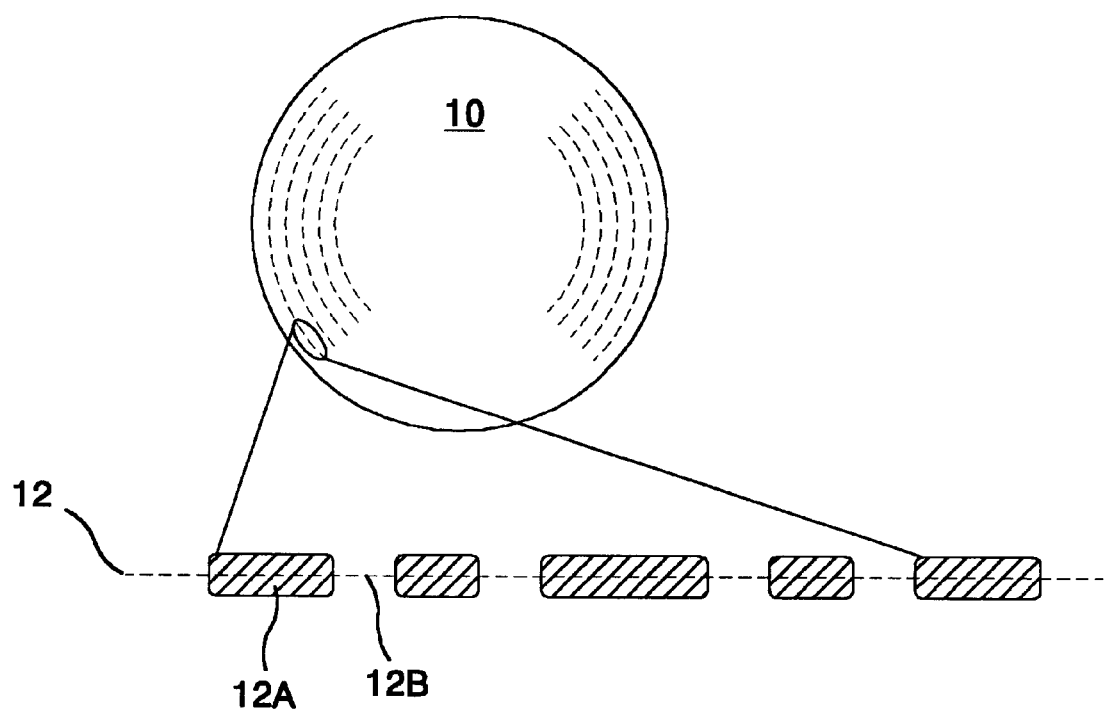
FIG. 1 shows a pit train defined on the conventional optical recording medium.
Figure 2:
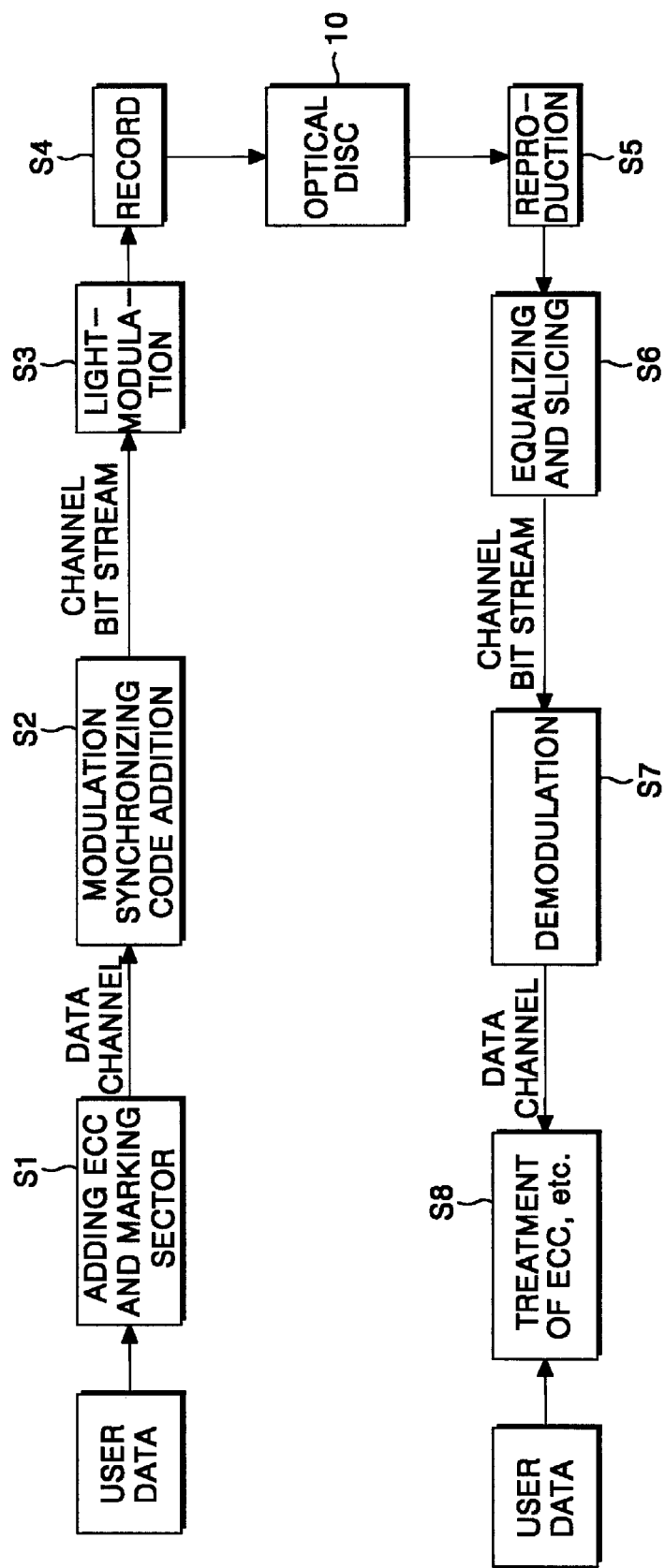
FIG. 2 is a flow chart for explaining a recording and reproducing method for the conventional optical recording medium.
Figure 3:
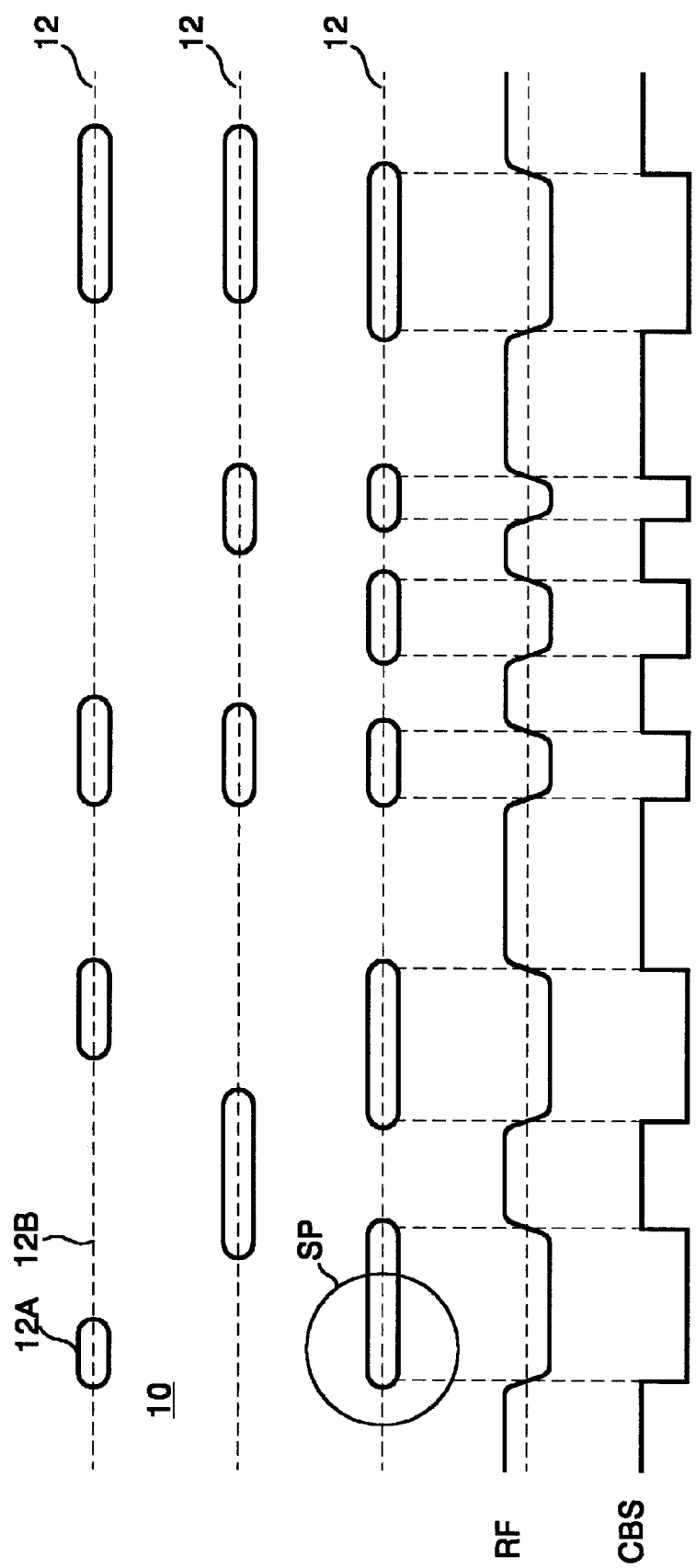
FIG. 3 is a waveform diagram showing a signal reproduced from a pit train defined on the conventional optical recording medium.
Figure 4:
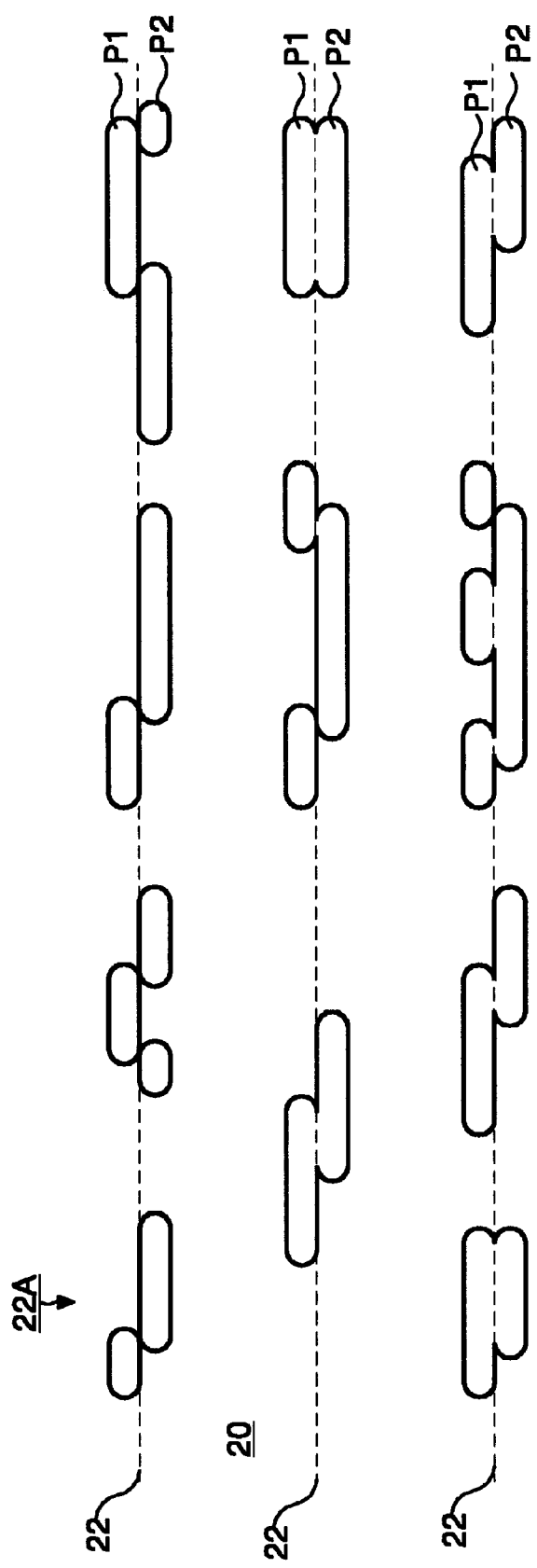
FIG. 4 shows a dual pit train defined on an optical recording medium according to an embodiment of the present invention.

Referring to FIG. 4, there is shown a shape of a pit train recorded on an optical recording medium 20 according to an embodiment of the present invention. The optical recording medium 20 includes a dual pot train arranged adjacently at the up and down position along a track reference line.

In the optical recording medium shown in FIG. 4, the dual pit train 22 makes a spiral or concentric circle shaped track. The dual pit train 22 consists of first and second pit trains P1 and P2 arranged adjacently along a track center line. The first and second pit trains P1 and P2 are accessed by a single light beam. In other words, the first and second pit trains P1 and P2 are arranged adjacently so that they can be accessed by a single light beam. In this case, patterns of the first and second pit trains P1 and P2 are applicable to a case of being contacted each other as shown in FIG. 4 as well as a case of being spaced by a distance accessible by a single light beam. Such first and second pit trains P1 and P2 can be recorded in correspondence with an information of different channel or in correspondence with an information of same channel.

First, when the first and second pit trains P1 and P2 are recorded in correspondence with an information of different channel, it is assumed that the first and second pit trains P1 and P2 correspond to information of the first and second channels CH1 and CH2, respectively. In this case, the information of two channels CH1 and CH2 can be simultaneously detected by a single light beam, and can be simultaneously reproduced by being separated through an appropriate signal processing procedure. Also, when it is intended to make use of only the first channel CH1 or the second channel CH2, an information of desired channel only may be reproduced. Second, when the first and second pit trains P1 and P2 are recorded in correspondence with an information of same channel, it is assumed that the first and second pit trains P1 and P2 be recorded by making a time division of an information of a single channel and alternating between the first and second pit trains P1 and P2. In this case, the information of the first and second channels CH1 and CH2 corresponding to the first and second pit trains P1 and P2 is simultaneously reproduced. Subsequently, the information of a single channel arranged in a time sequence like an original information can be reproduced by selecting the reproduced information of the first and second channels CH1 and CH2 alternately every certain period. As described above, since the optical recording medium according to the present invention stores an information in a shape of dual pit train and reproduces the stored information, it can increase a recording density into more than twice.

Furthermore, the optical recording medium according to the present invention can record an information in such a manner that one dual pit 22A corresponds to the existent single pit so as to make a changeability with recording media such as the existent CD and DVD, etc. In other words, it is possible to record an information by making a total length of one dual pit 22A correspond to the conventional pit length. In this case, it has an advantage in that, since an information stored in the optical recording medium according to the present invention can be reproduced by a driving apparatus for the existent optical recording medium (i.e., CD or DVD, etc.), the optical recording medium according to the present invention has a changeability with the existent optical recording medium.

As a result, the optical recording medium according to the present invention stores an information in a shape of dual pit train to enhance a recording density at least twice, and has a changeability with the existent optical recording media such as CD and DVD, etc. when recording a total length of the dual pit as a single pit length. Further, the optical recording medium according to the present invention is applicable in the similar manner to a read-only type medium recorded in the above-mentioned pit shape as well as recordable media, that is, a phase-change recording medium and an opto-magnetic recording medium. For example, in the case of the phase-change or optomagnetic recording medium, the recorded information (or data) makes a phase-change or opto-magnetic recording mark in a shape of dual pit in FIG. 4. Also, in the case of a land/groove recording system, marks (or pits) are defined as shown in FIG. 4 wherein the first pit train P1 and the second pit train P2 can be recorded on the land and the groove, respectively. Hereinafter, the pit and mark, etc. are referred to as "pit". The pit train recorded in this manner can be reproduced by a method as will be described later.

Figure 5:
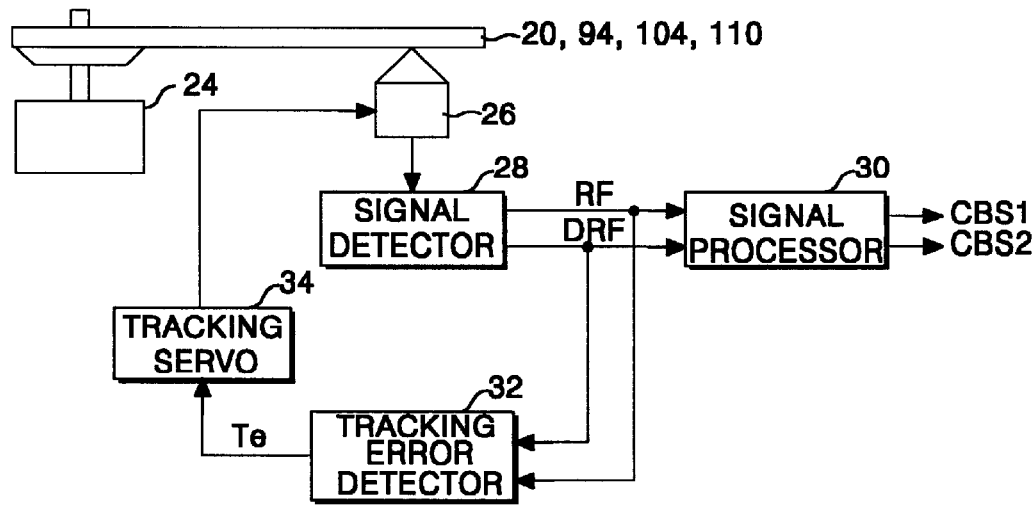
FIG. 5 is a block diagram showing the configuration of an optical reproducing apparatus.

Referring now to FIG. 5, there is shown an optical reproducing apparatus for reproducing an information from the optical recording medium in FIG. 4. The optical reproducing apparatus includes an optical pickup 26 for irradiating a light beam onto an optical recording medium 20 rotated by means of a spindle motor 24 and for detecting and photoelectric-converting a reflective light beam, a signal detector 28 for detecting two radio frequency signals from signals outputted from the optical pickup 26, a signal processor 30 for processing the radio frequency signals from the signal detector 28 and outputting a channel bit stream CBS, a tracking error detector 32 for detecting a tracking error signal Te from the radio frequency signals, and a tracking servo 34 for responding to the tracking error signal Te outputted from the tracking error detector 32 to carry out a tracking compensation.

In the optical reproducing apparatus of FIG. 5, the optical recording medium 20 stores an information recorded in the shape of dual pit train 22 as shown in FIG. 4. The optical pickup 26 irradiates a light beam outputted from a light source onto an information recording face of the optical recording medium 20 rotated by the spindle motor 24 in such a manner to trace the center of a track. A photo detector divided usually into a plurality of photo detecting cells detects an amount of reflective light beam and converts the same into a plurality of electrical signals. The signal detector 28 detects a radio frequency signal RF and a differential radio frequency signal DRF from the plurality of electrical signals outputted from the optical pickup 26. The signal processor 30 level-slices the radio frequency signal RF and the differential radio frequency signal DRF outputted from the signal detector 28 to converts the same into a rectangular wave and thereafter making a logical operation of it, thereby generating a channel bit stream CBS. The tracking error detector 32 makes use of the reference signal RF and the differential radio frequency signal DRF outputted from the signal detector 28. The tracking servo 34 responds to a tracking error signal Te outputted from the tracking error detector 32 to generate a tracking compensating signal, thereby controlling a current signal or a voltage signal applied to an actuator of the optical pickup 26. Accordingly, the optical pickup 26 moves an objective lens upwardly or downwardly, that is, toward the inner circumference or the outer circumference in accordance with the tracking compensating signal outputted from the tracking servo 34 to thereby allows a light beam to trace the center line of the dual pit train 22.

Figure 6:
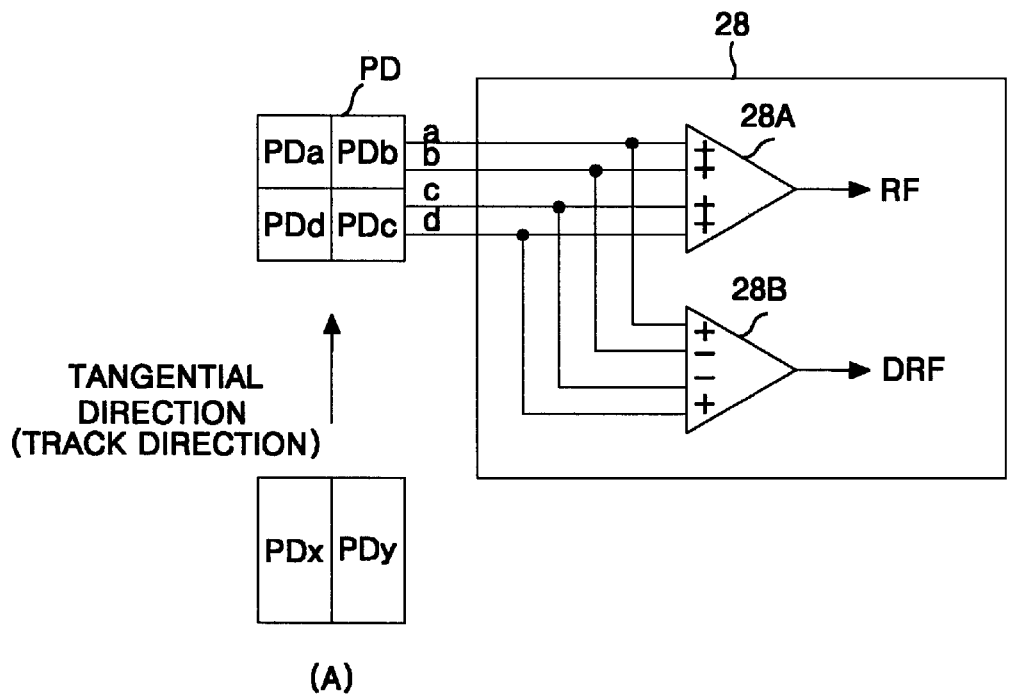
FIG. 6 is a detailed circuit diagram of the signal detector shown in FIG. 5.
Figure 8:
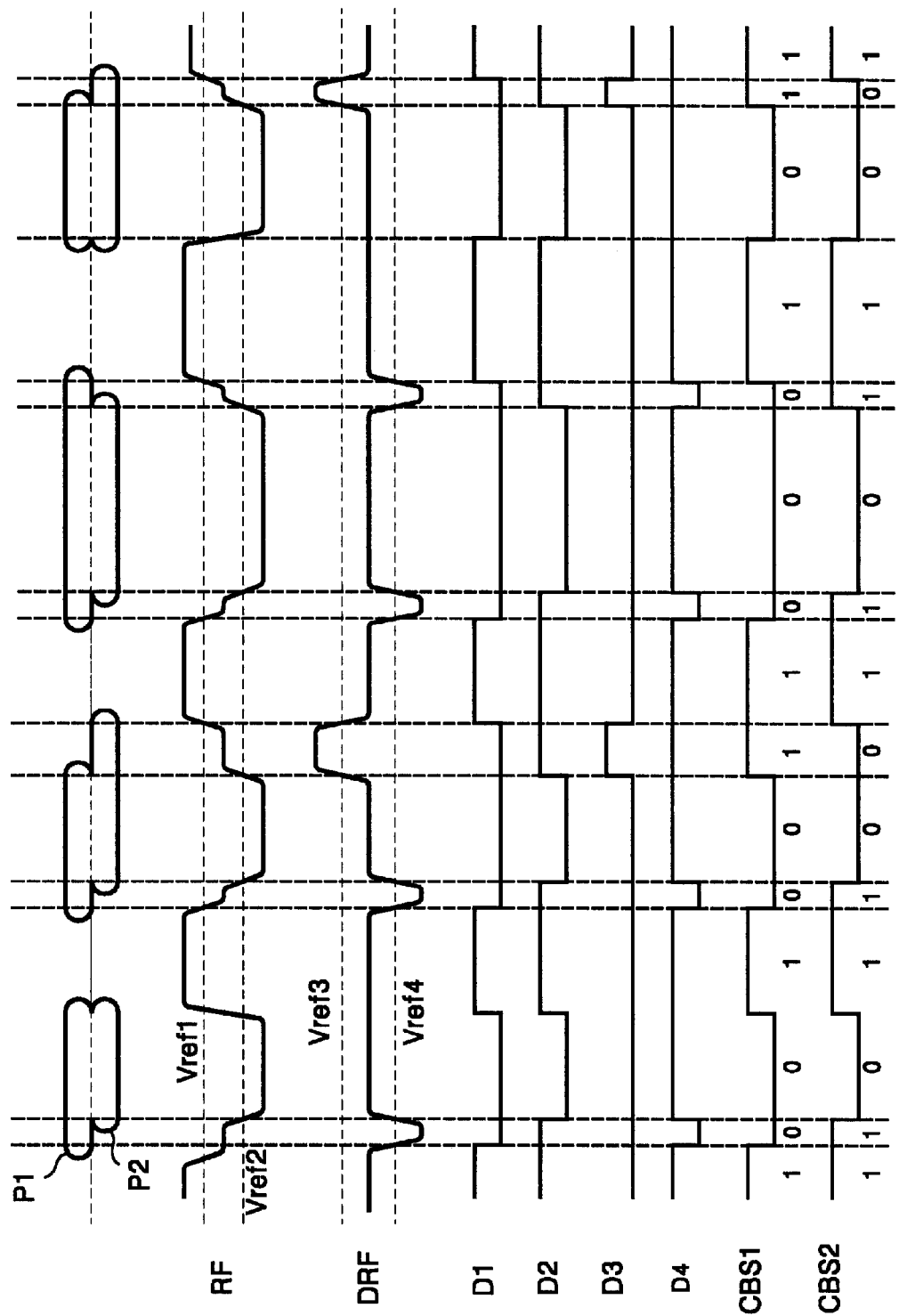
FIG. 8 is waveform diagrams representing signals outputted from each constructional element of the signal detector shown in FIG. 6 and the signal processor shown in FIG. 7.

Referring to FIG. 6, there is shown in detail the signal detector 28 connected to the photo detector included in the optical pickup 26 in FIG. 5. The photo detector PD shown in FIG. 6 consists of four optical detecting cells PDa, PDb, PDc and PDd divided in the tangential direction, that is, the track direction and in the radial direction so that a distributed state of a light beam irradiated onto the track can be detected accurately. Each of the four-divisional optical detecting cells PDa, PDb, PDc and PDd arranged in a sequence of clockwise direction on a basis of the track direction convert a reflective light amount into an electrical signal to generate electrical signals a, b, c and d proportional to the reflective light amount. The signal detector 28 processes the signals a, b, c and d outputted from the four-divisional photo detector PD to generate a radio frequency signal RF and a differential radio frequency signal DRF. To this end, the signal detector 28 includes an adder amplifier 28A and a differential amplifier 28B. In the signal detector 28, the adder amplifier 28A adds output signals a, b, c and d from the four-divisional photo detecting cells PDa, PDb, PDc and PDd of the photo detector PD to generate a radio frequency signal RF. In this case, the radio frequency signal RF outputted from the adder amplifier 28A emerges into a voltage waveform with a three state level as shown in FIG. 8. More specifically, a high level voltage is generated when all the first and second pit trains P1 and P2 are mirrors; an intermediate level voltage is generated when only any one of the first and second pit trains P1 and P2 is a pit; and a low level voltage is generated when all the first and second pit trains P1 and P2 are pits. The differential amplifier 28B differentially amplifies a sum of two electrical signals b and c generated from two photo detecting cells PDb and PDc located at the right side from a sum of two electrical signals a and d generated from two photo detecting cells PDa and PDd located at the left side to thereby generate a differential radio frequency signal DRF. The differential radio frequency signal DRF outputted from the differential amplifier 28B also emerges into a voltage waveform with a three-state level as shown in FIG. 8. More specifically, an intermediate level voltage is generated when all the first and second pit trains P1 and P2 are mirrors and pits; a low level voltage is generated when only the first pit train P1 at the inner circumference side is a pit; and a high level voltage is generated when only the second pit train P2 at the outer circumference side is a pit.

Meanwhile, when the photo detector PD consists of two photo detecting cells PDx and Pdy divided in the track direction as shown in FIG. 6A, the signal detector 28 adds and amplifies output signals x and y from each photo detecting cell PDx and Pdy to detect a radio frequency signal RF, and differentially amplifies the output signals x and y to detect a differential radio frequency signal DRF.

Figure 7:
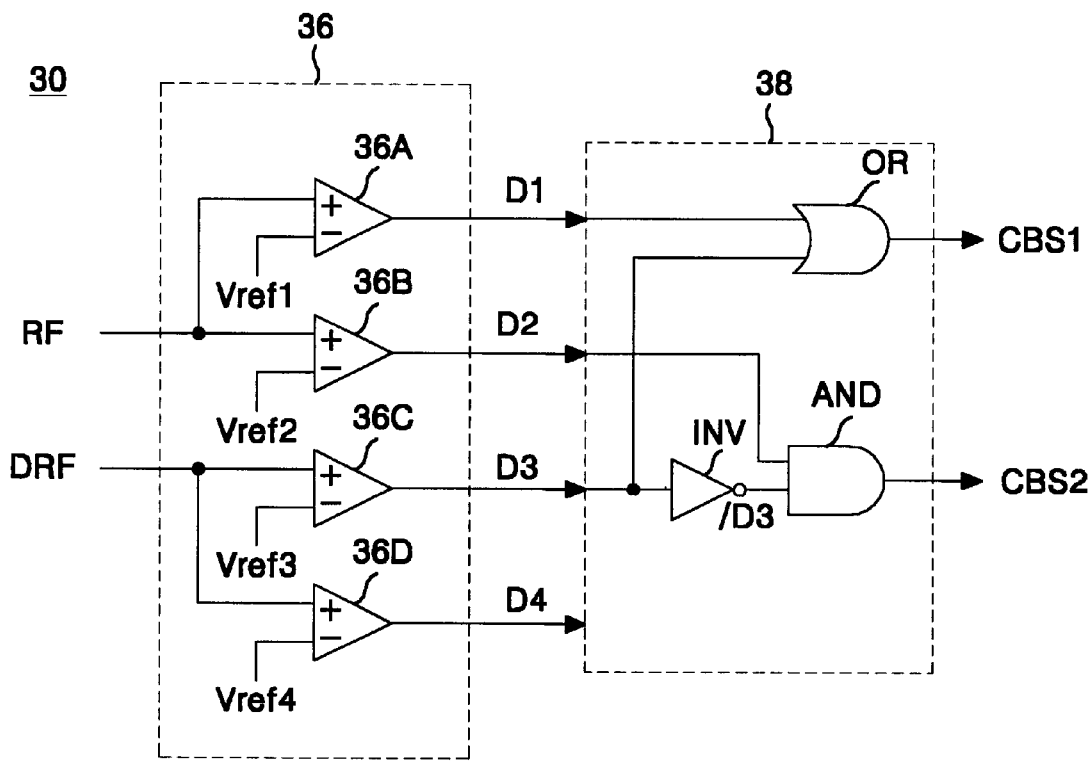
FIG. 7 is a detailed circuit diagram of the signal processor shown in FIG. 5.

Referring now to FIG. 7, there is shown a detailed circuit of the first embodiment of the signal processor 30 in FIG. 5. The signal processor 30 includes a comparator 36 for level-slicing the radio frequency signal RF and the differential radio frequency signal DRF to generate rectangular detecting signals D1, D2, D3 and D4, and a logical arithmetic unit 38 for making a logical operation of the detecting signals D1, D2, D3 and D4 outputted from the comparator 36 to generate first and second channel bit stream CBS1 and CBS2 corresponding to the first and second pit trains P1 and P2, respectively.

In the signal processor 30 shown in FIG. 7, the comparator 36 includes first and second comparators 36A and 36B for level-slicing the radio frequency signal RF into a different reference voltage, and third and fourth comparators 36C and 36D for level-slicing the differential radio frequency signal DRF into a different reference signal. In the comparator 36, the first comparator 36A detects a portion at which all the first and second pit trains P1 and P2 are mirrors. To this end, the first comparator 36A compares the radio frequency signal RF with a first reference voltage Vref1 to generate a first detecting signal D1 having a high state when the radio frequency signal RF is a high level as shown in FIG. 8. The first reference voltage Vref1 is set to a voltage value between a high level and an intermediate level. The second comparator 36B detects a portion at which all the first and second pit trains P1 and P2 are pits. To this end, the second comparator 36B compares the radio frequency signal RF with a second reference voltage Vref2 to generate a second detecting signal D2 having a low state only in a low level of radio frequency signal RF as shown in FIG. 8. The second reference voltage Vref2 is set to a voltage between an intermediate level and a low level of the high frequency signal RF. The third comparator 36C detects a portion at which only the second pit train P2 at the outer circumference side is a pit. To this end, the third comparator 36C compares the differential radio frequency signal RF with the third reference voltage Vref3 to generate a third detecting signal D3 having a high state only in a high level of differential radio frequency signal DRF as shown in FIG. 8. The third reference voltage Vref3 is set to a voltage value between a high level and an intermediate level of the radio frequency signal DRF. The fourth comparator 36D detects a portion at which only the first pit train P1 at the inner circumference side is a pit. To this end, the fourth comparator 36D compares the differential radio frequency signal DRF with a fourth reference voltage Vref4 to generate a fourth detecting signal D4 having a low state only in a low level of differential radio frequency signal DRF as shown in FIG. 8. The fourth reference voltage Vref4 is set to a voltage value between an intermediate level and a low level of the differential radio frequency signal DRF.

The logical arithmetic unit 38 shown in FIG. 7 makes use of the first to fourth detecting signals D1, D2, D3 and D4 detected from the comparator 36 and makes a logical operation of them as given by the following Bull algebraical expression to thereby simultaneously detect the first channel bit stream CBS1 corresponding to the first pit train P1 and the second channel bit stream CBS2 corresponding to the second pit train P2.

$$CBS1 = D1 + D3 = D2D4$$
$$CBS2 = D2\overline{D3} = D1\overline{D4} \qquad (1)$$

More specifically, the logical arithmetic unit 38 makes a logical sum operation of the first detecting signal D1 and the third detecting signal D3 or makes a logical product operation of the second detecting signal D2 and the fourth detecting signal D4, thereby detecting the first channel bit stream CBS1. Also, the logical arithmetic unit 38 makes a logical product operation of the second detecting signal D2 and a phase-inverted third detecting signal /D3 or makes a logical sum operation of the first detecting signal D1 and a phase-inverted fourth detecting signal /D4, thereby detecting the second channel bit stream CBS2. As a result, the configuration of the logical arithmetic unit 30 combines two cases of detecting the first channel bit stream CBS1 with two cases of detecting the second channel bit stream CBS2 to have four numbers of case. Any one of the first to fourth detecting signals D1 to D4 is not used for each configuration of the logical arithmetic unit 30 having such four numbers of case.

For instance, as shown in FIG. 7, the logical arithmetic unit 38 includes an OR gate OR for making a logical sum operation of the first detecting signal D1 and the third detecting signal D3, an inverter INV for phase-inverting the third detecting signal D3, and an AND gate AND for making a logical product operation of a phase-inverted third detecting signal /D3 and the second detecting signal D2. The OR gate OR makes a logical sum operation of the first detecting signal D1 and the third detecting signal D3 to generate the first channel bit stream CBS1 as shown in FIG. 8. The AND gate AND makes a logical product operation of the phase-inverted third detecting signal /D3 and the second detecting signal D2 to generate the second channel bit stream CBS2 as shown in FIG. 8. In this case, it should be noted that the fourth detecting signal D4 is not used for the logical operations.

Figure 9:
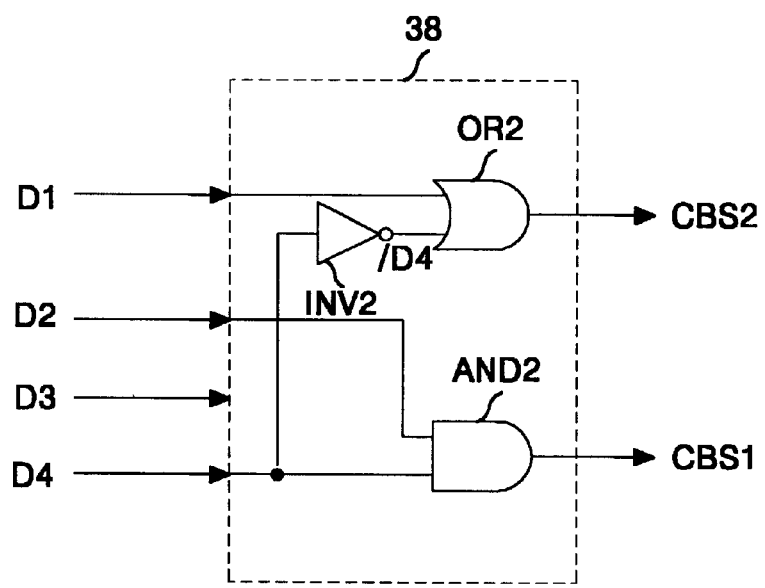
FIG. 9 is a circuit diagram of a second embodiment of the logic arithmetic unit shown in FIG. 7.

Furthermore, as shown in FIG. 9, the logical arithmetic unit 38 includes an AND gate AND2 for making a logical product operation of the second detecting signal D2 and the fourth detecting signal D4, an inverter INV2 for phase-inverting the fourth detecting signal D4, and an OR gate OR2 for making a logical operation of a phase-changed detecting signal /D4 and the first detecting signal D1. The AND gate AND2 receives the second detecting signal D2 and the fourth detecting signal D4 and makes a logical product operation of them to generate the first channel bit stream CBS1. The OR gate OR2 inputs the phase-changed fourth detecting signal /D4 and the first detecting signal D1 and makes a logical sum operation of them to generate the second channel bit stream CBS2. In this case, it should be noted that the third detecting signal D3 is-not used for the logical operations.

Figure 10:
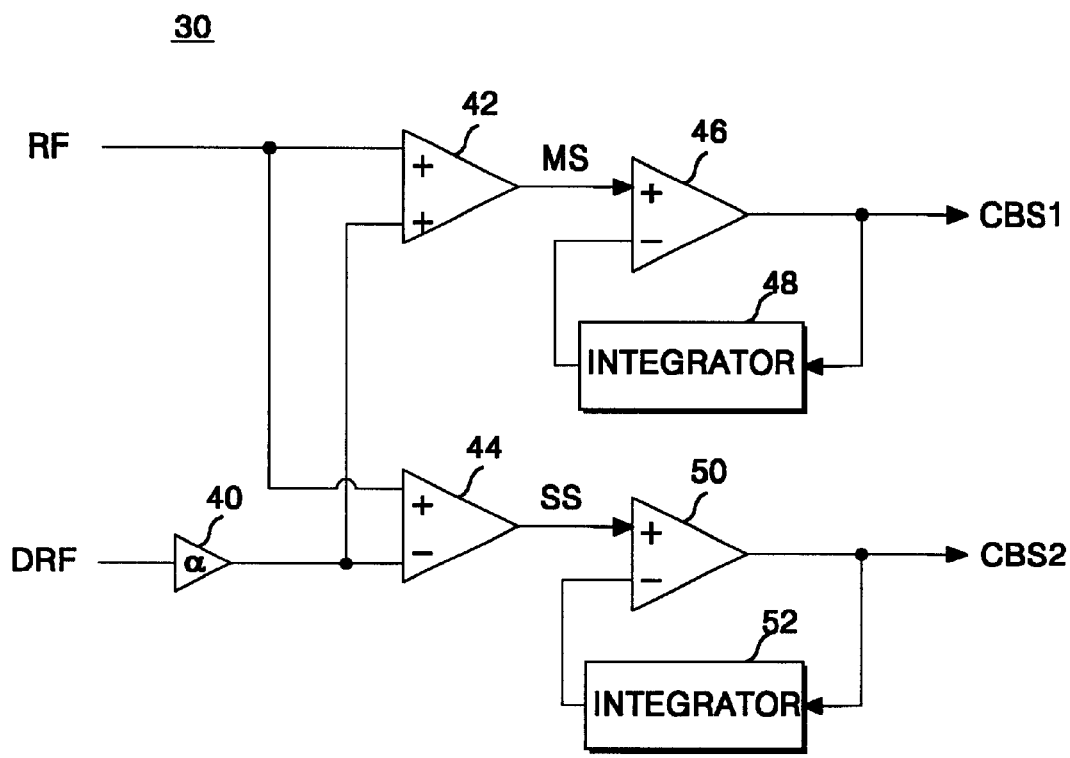
FIG. 10 is a circuit diagram of a second embodiment of the signal processor shown in FIG. 5.
Figure 11:
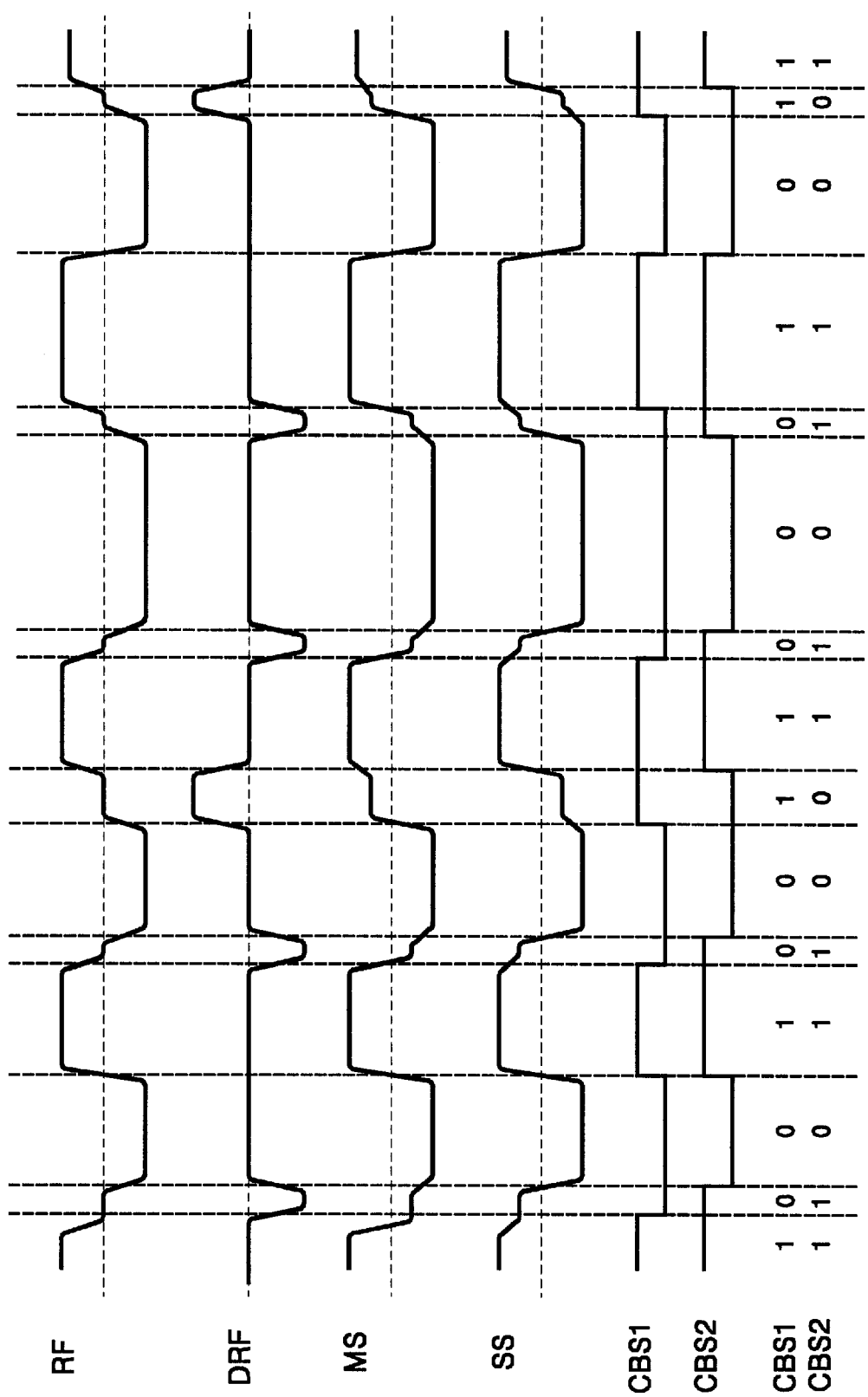
FIG. 11 is waveform diagrams representing input and output signals of each constructional element included in the signal processor shown in FIG. 10.

Referring now to FIG. 10, there is shown a detailed circuit of the second embodiment of the signal processor 30 in FIG. 5. The signal processor 30 makes use of a sum signal of the radio frequency signal RF and the differential radio frequency signal DRF to detect a first channel bit stream CBS1 corresponding to the first pit train P1; while making use of a difference signal of the radio frequency signal RF and the differential radio frequency signal DRF to detect a second channel bit stream CBS2 corresponding to the second pit train P2. To this end, the signal processor 30 includes an amplifier 40 for amplifying the differential radio frequency signal DRF, an adder 42 for generating a sum signal MS of the radio frequency signal RF and the amplified differential radio frequency signal DRF, a subtractor 44 for generating a difference signal SS between the radio frequency signal RF and the amplified differential radio frequency signal DRF, a first comparator 46 and a first integrator 48 for zero-crossing the sum signal MS, and a second comparator 50 and a second integrator 52 for zero-crossing the difference signal SS. The amplifier 40 amplifies the differential radio frequency signal DRF by a predetermined multiple α and outputs the same. The adder 42 adds the radio frequency signal DRF to the amplified differential radio frequency signal DRF to generate a sum signal MS as shown in FIG. 11. The subtractor 44 subtract the amplified differential radio frequency signal DRF from the radio frequency signal RF to generate a difference signal as shown in FIG. 11. The first comparator 46 compares the sum signal MS outputted from the adder 42 with a reference voltage, that is, a center voltage outputted from the first integrator 48 to generate a first channel bit stream CBS1. In this case, the first channel bit stream CBS1 is generated in a rectangular wave shape having a high state when the sum signal MS is larger than the center voltage while having a low state when the sum signal MS is smaller than the center voltage. The first integrator 48 is connected between the output terminal and the inverting input terminal (−) of the first comparator 46 to integrate a rectangular wave signal of the first comparator 46, thereby outputting the center voltage as a reference voltage of the first comparator 46. The second comparator 50 compares the difference signal SS outputted from the subtractor 44 with the center voltage outputted from the second integrator 52 to generate a second channel bit stream CBS2. The second channel bit stream CBS2 is generated in a rectangular wave shape having a high state when the difference signal SS is larger than the center voltage while having a low state when the difference signal SS is smaller than the center voltage. The second integrator 52 is connected between the output terminal and the inverting input terminal (−) of the second comparator 50 to integrate an output signal of the second comparator 50, thereby outputting the center voltage as a reference voltage of the second comparator 50.

As described above, the signal processor 30 simultaneously detects the first and second channel bit stream CBS1 and CBS2 corresponding to the first and second pit trains P1 and P2, respectively. In this case, the first and second channel bit stream CBS1 and CBS2 can be reconstructed simultaneously or reconstructed by selecting any one thereof by a user. Particularly, the first and second pit trains P1 and P2 makes a time division of an original information and selectively outputs the first and second channel bit stream CBS1 and CBS2 alternately every certain period using a multiplexor when they have been alternately recorded, thereby reconstructing them into an original information shape.

Figure 12:
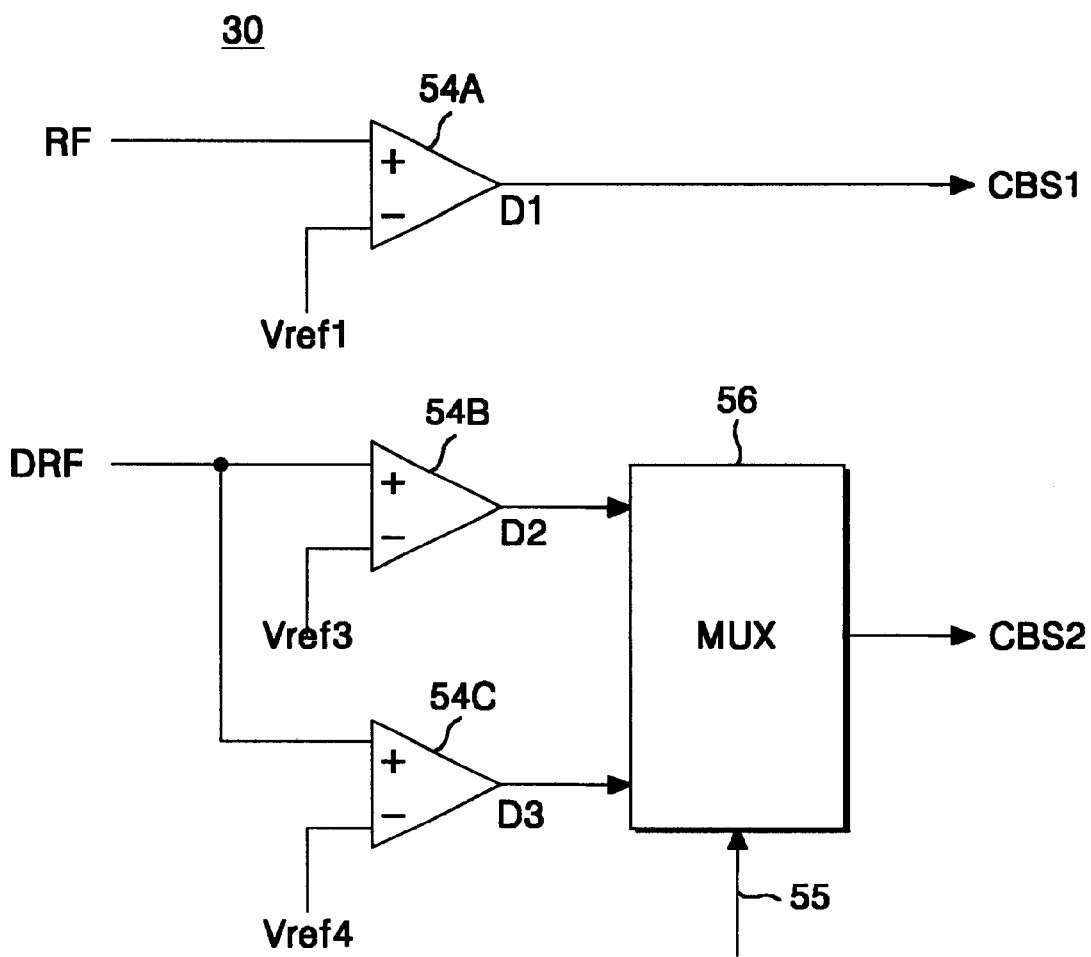
FIG. 12 is a circuit diagram of a third embodiment of the signal processor shown in FIG. 5.

Referring to FIG. 12, there is shown a detailed circuit of the third embodiment of the signal processor 30 in FIG. 5. Particularly, the signal processor in FIG. 12 can reproduce an information in such a manner that one dual pit 22A corresponds to the existent single pit as well as an information recorded in the first and second pit trains P1 and P2.

Figure 13:
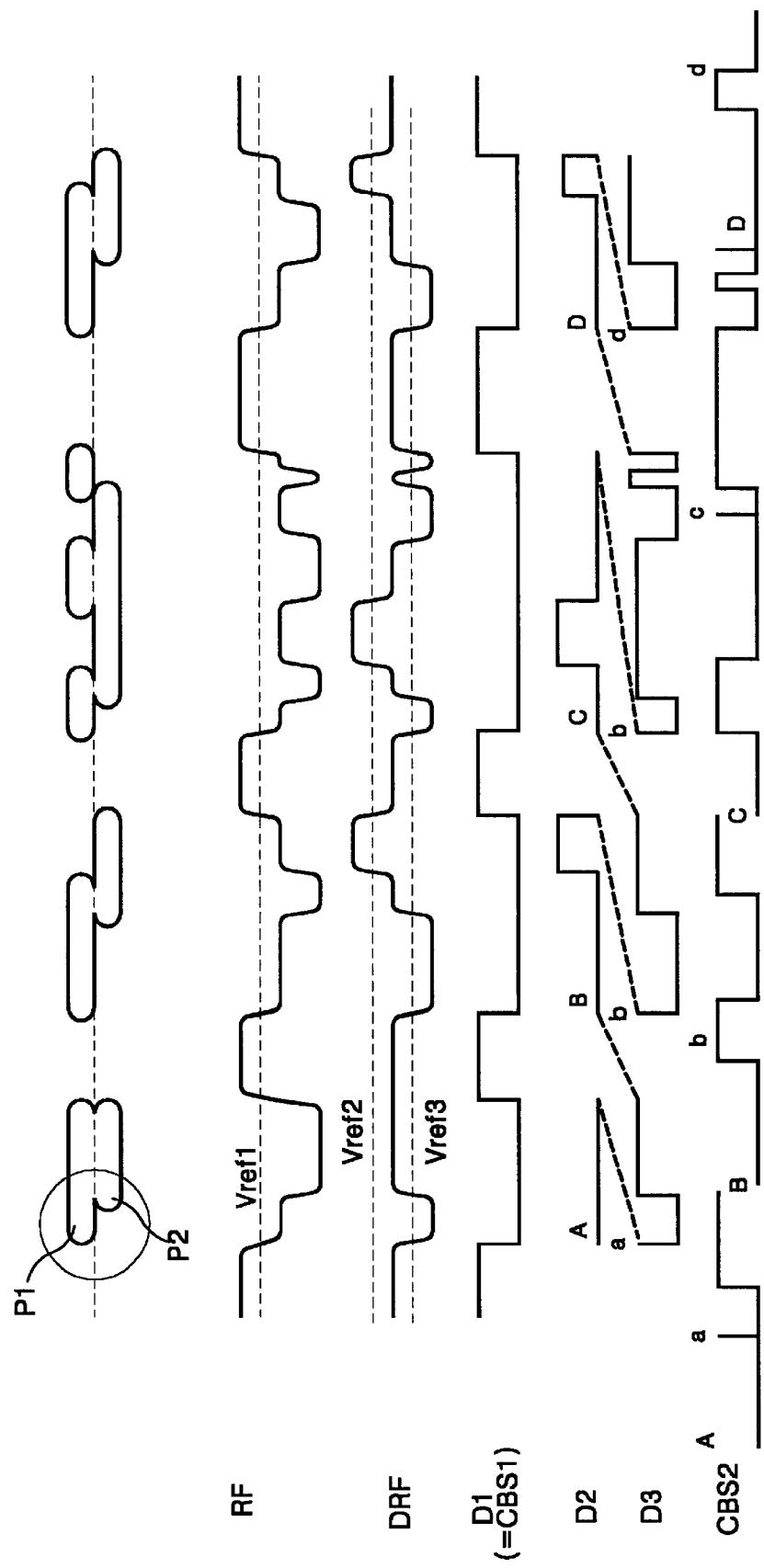
FIG. 13 is waveform diagrams representing input and output signals of each constructional element included in the signal processor shown in FIG. 12.

The signal processor 30 shown in FIG. 12 includes a first comparator 56A for level-slicing a radio frequency signal RF, second and third comparators 56B and 56C for level-slicing a differential radio frequency signal DRF, and a multiplexor 58 for selectively outputting output signals of the second and third comparators 56B and 56C. The first comparator 56A compares the radio frequency signal RF with a first reference signal Vref1 to generate a first detecting signal D1 as shown in FIG. 13. Herein, the first reference voltage Vref1 is set to a voltage value between a high level and an intermediate level of the radio frequency signal RF. The first detecting signal D1 has a high voltage level when the radio frequency signal RF is a high level, that is, when all the first and second pit trains P1 and P2 are mirrors. This detecting signal D1 corresponds to a first channel bit stream CBS1 when a total length of one dual pit 22A is recorded in correspondence with one pit length. The second comparator 56B compares the differential radio frequency signal DRF with a second reference voltage Vref2 to generate a second detecting signal D2 as shown in FIG. 13. Herein, the second reference voltage Vref2 is set to a voltage value between a high level and an intermediate level of the differential radio frequency signal DRF. The second detecting signal D2 has a high voltage level when the differential radio frequency signal DRF is a high level, that is, when only the first pit train P1 in the dual pit 22A is a mirror. This second detecting signal D2 corresponds to an information recorded by the first pit train P1 in the dual pit train 22. The third comparator 56C compares the differential radio frequency signal DRF with the above-mentioned third reference voltage Vref3 to generate a third detecting signal D3 as shown in FIG. 13. Herein, the third reference voltage Vref3 is set to a voltage value between an intermediate level and a low level of the radio frequency signal RF. The third detecting signal D3 has a low voltage level when the differential radio frequency signal DRF is a low level, that is, when only the second pit train P2 in the dual pit 22A is a mirror. This third detecting signal D3 corresponds to an information recorded by the second pit train P2 in the dual pit train 22. The multiplexor 58 selectively outputs the second and third detecting signals D2 and D3 inputted from the second and third comparators 54B and 54C, respectively, by a control signal inputted from the exterior over a control line. Herein, when the first pit train P1 and the second pit train P2 corresponds to an information in which an information of same channel is time-divided, the multiplexor 54 outputs the second and third detecting signals D2 and D3 alternately in a time-divisional period. Accordingly, the multiplexor 56 outputs a second channel bit stream CBS2 which is continued-in the time as shown in FIG. 13. On the other hand, when an information of different channel is recorded to each of the first pit train P1 and the second pit train P2, the multiplexor 56 selectively outputs any one of the second and third detecting signals D2 and D3 by a control signal over a control line 53. Accordingly, the multiplexor 56 can output a channel bit stream CBS corresponding to the first pit train P1 or a channel bit stream CBS corresponding to the second pit train P2.

Figure 14:
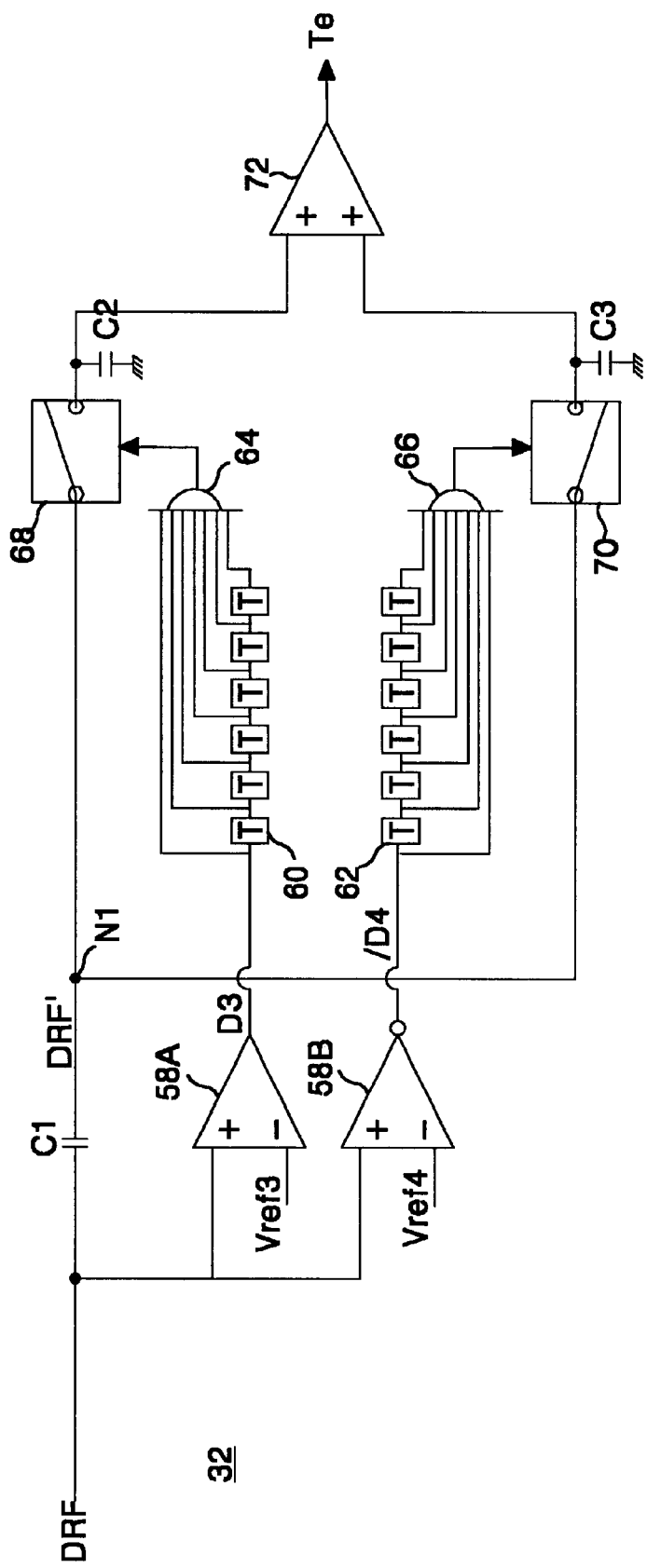
FIG. 14 is a circuit diagram of a first embodiment of the tracking error detector shown in FIG. 5.

Referring now to FIG. 14, there is shown a detailed circuit of the first embodiment of the tracking error detector 32 in FIG. 5. The tracking error detector 32 includes first and second comparators 58A and 58B for level-slicing the differential radio frequency signal DRF outputted from the signal detector 28, first and second delays 60 and 62 for delaying each output signal of the first and second comparators 58A and 58B by a desired time interval, a first AND gate 64 for making a logical product operation of each output signal of the first delay 60, a second AND gate 66 for making a logical product operation of each output signal of the second delay 62, first and second switches 68 and 70 for responding to each output signal of the first and second AND gates 64 and 66 to sample and hold the differential radio frequency signal DRF, and an adder 72 connected to output terminals of the first and second switches 68 and 70.

In the tracking error detector 24 shown in FIG. 14, the first comparator 58A compares the differential radio frequency signal DRF with the third reference voltage Vref3 in similarity to the third comparator 36C shown in FIG. 7 to generate a third detecting signal D3. The third detecting signal D3 has a high voltage level only at a portion where the first pit train P1 in the dual pit 22A is a mirror. The second comparator 58B compares the differential radio frequency signal DRF in similarity to the fourth comparator 36D shown in FIG. 7 to generate a fourth detecting signal D4. The fourth detecting signal D4 has a low voltage level only at a portion where the second pit train P2 in the dual pit 22A is a mirror. The fourth detecting signal D4 is phase-inverted by an inverter INV connected to the output terminal of the second comparator 58B. A plurality of first delay 60 connected, in a line, to the output terminal of the first comparator 58A shifts the third detecting signal D3 outputted from the first comparator 58A by delaying the same by a certain time interval T in accordance with its time constant τ. Accordingly, if the third detecting signal D3 is shifted until the last delay 60, then an output signal of each first delay 60 is simultaneously input to the first AND gate 64. In other words, when six first delays 60 are included, the third detecting signal D3 during 6T interval sampled in the T unit is simultaneously input to the first AND gate 64. The purpose of this is to improve a responsibility of the tracking error signal Te detected later by detecting a pit state sustained during more than 6T interval. The first AND gate 64 generates a high state output signal when all the third detecting signals D3 sampled by each first delays 60 maintain a high state, that is, when a high state of third detecting signal D3 is maintained during 6T interval. In a similar manner, the second delays 62 also samples the phase-inverted fourth detecting signal /D4 in the T unit.

During 6T interval and outputs the same to the second AND gate 70 simultaneously. The second AND gate 70 generates a high output signal when the phase-changed fourth detecting signal /D4 maintains a high state during 6T interval. The differential radio frequency signal DRF generated from the signal detector 28 is applied to the first node N1 in a state (DRF') having a direct current (DC) component removed by the first capacitor C1 connected in a series. The first switch 68 responds to the output signal of the first AND gate 64 to sample and hold the differential radio frequency signal DRF' inputted via a first node N1. More specifically, the first switch 68 samples and outputs the differential radio frequency signal DRF' inputted via the first node N1 when the output signal of the first AND gate 64 is a high state. On the other hand, the first switch 68 holds and outputs the differential radio frequency signal DRF' when the output signal of the first AND gate 64 is a low state. In a similar manner, the second switch 70 responds to the output signal of the second AND gate 66 to sample and hold the differential radio frequency signal DRF' inputted via the first node N1. More specifically, the second switch 70 samples and outputs the differential radio frequency signal DRF' inputted via the first node N1 when the output signal of the second AND gate 66 is a high state. On the other hand, the second switch 70 holds and outputs the differential radio frequency signal DRF' when the output signal of the second AND gate 66 is a low state. Each of the second and third capacitors C2 and C3 connected between the output terminals of the first and second switches 68 and 70 and a ground is responsible for removing a high frequency noise in a signal outputted from the first and second switches 68 and 70. Accordingly, the adder 72 inputs and adds only a DC component in the output signals of the first and second switches 68 and 70 to generate a tracking error signal Te.

Figure 15:
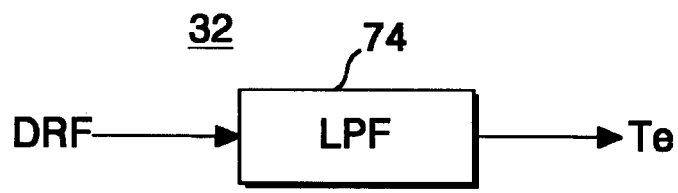
FIG. 15 is a circuit diagram of a second embodiment of the tracking error detector shown in FIG. 5.

Referring to FIG. 15, there is shown a detailed circuit of the second embodiment of the tracking error detector 32 in FIG. 7. The tracking error detector 32 includes a low pass filter (LPF) 74 for integrating the differential radio frequency signal DRF outputted from the signal processor 28. The low pass filter 74 integrates the differential radio frequency signal DRF outputted from the signal processor 28 to thereby generate an average voltage value of the differential radio frequency signal DRF as a tracking error signal Te.

Figure 16:
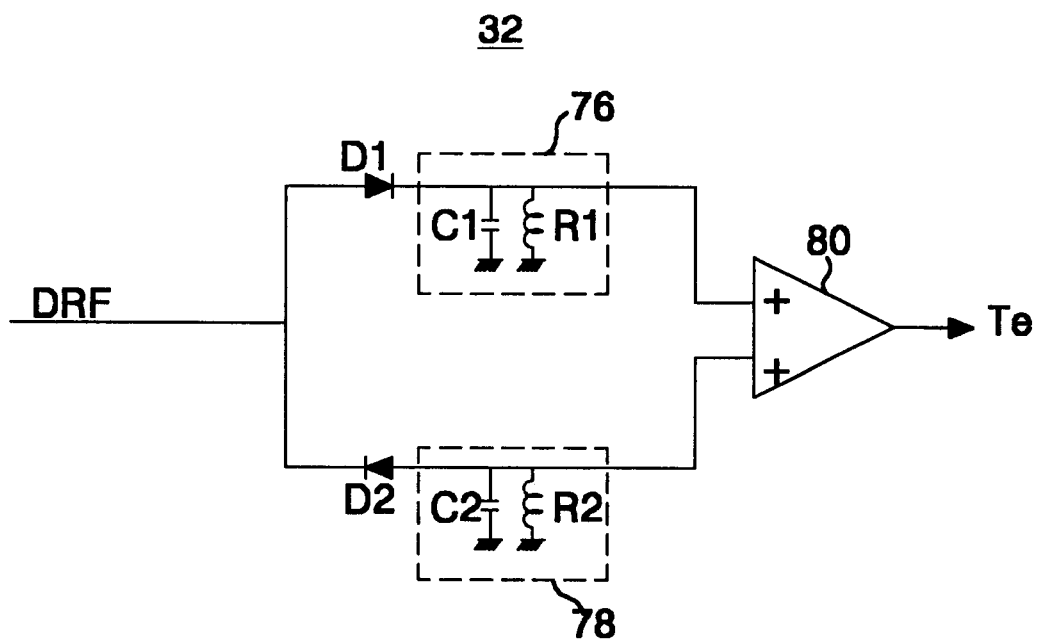
FIG. 16 is a circuit diagram of a third embodiment of the tracking error detector shown in FIG. 5.

Referring now to FIG. 16, there is shown a detailed circuit of the third embodiment of the tracking error detector 32 in FIG. 7. The tracking error detector 32 includes first and second diodes DO1 and DO2 for making a half-wave rectification of the differential radio frequency signal DRF generated from the signal detector 28, first and second low pass filters 76 and 78 for integrating each output signal of the first and second diodes DO1 and DO2, and a comparator 80 for comparing the output signals of the first and second low pass filters 76 and 78 to generate a tracking error signal Te.

In the tracking error detector 32, the first diode DO1 half-wave rectifies and outputs the differential radio frequency signal DRF generated from the signal processor 28. The second diode DO2 also half-wave rectifies and outputs the differential radio frequency signal DRF. The first low pass filter 76 integrates the differential radio frequency signal DRF half-wave rectified in a positive direction by means of the first diode DO1 and outputs it to the comparator 80. In this case, the first low pass filter 76 consists of a first capacitor C1 and a first resistor R1 connected, in parallel, between the output terminal of the first diode DO1 and the ground. In a similar manner, the second low pass filter 78 integrates the differential radio frequency signal DRF half-wave rectified in a negative direction by means of the second diode DO2 and outputs it to the comparator 80. In this case, the second low pass filter 78 consists of a second capacitor C2 and a second resistor R2 connected, in parallel, between the output terminal of the first diode DO1 and the ground.

Figure 17:
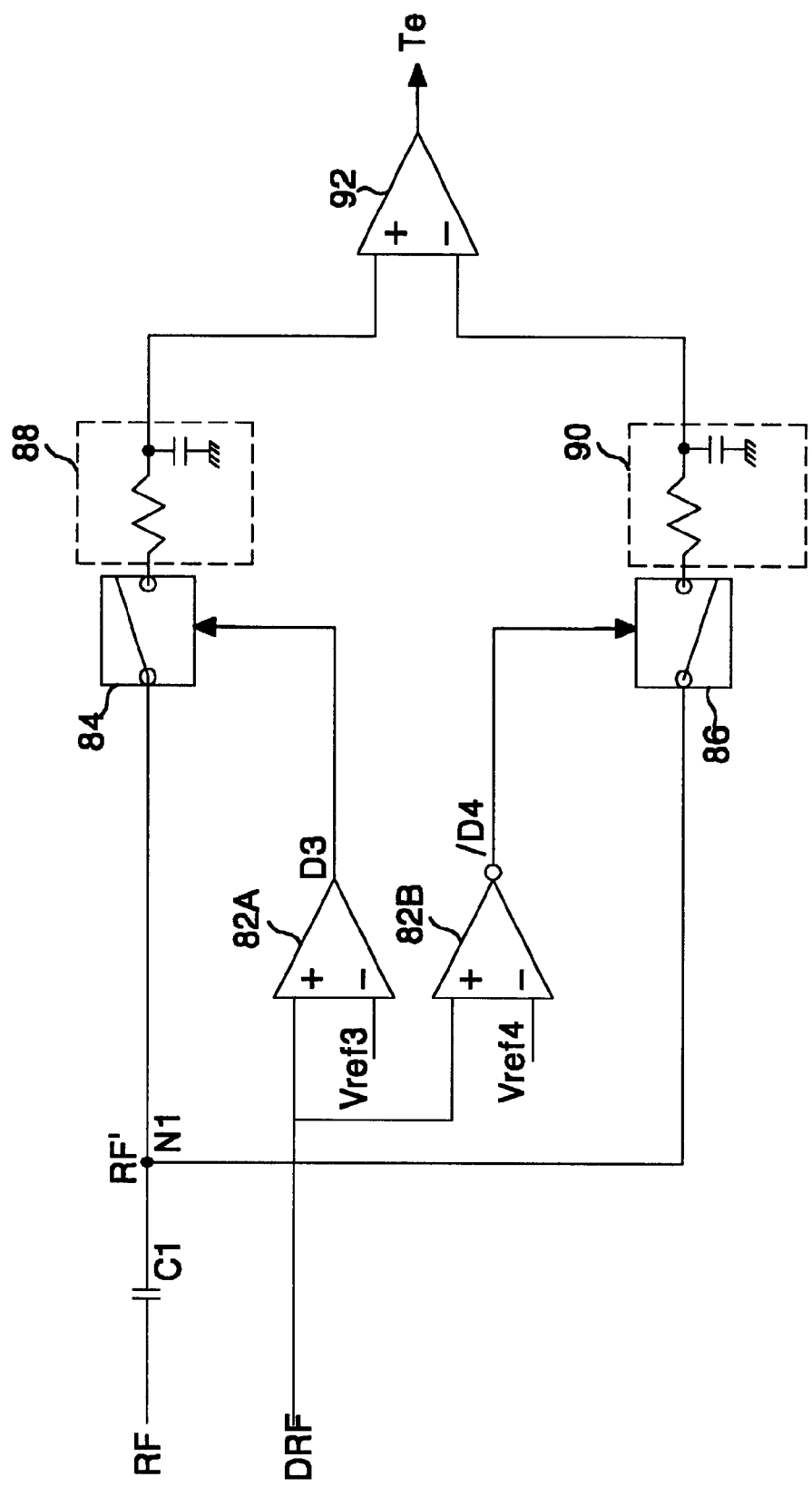
FIG. 17 is a circuit diagram of a fourth embodiment of the tracking error detector shown in FIG. 5.

Referring now to FIG. 17, there is shown a detailed circuit of the fourth embodiment of the tracking error detector 32 in FIG. 7. The tracking error detector 32 includes first and second comparators 82A and 82B for level-slicing the differential radio frequency signal DRF generated from the signal processor 28, first and second switches 84 and 86 for responding to each output signal of the first and second comparators 82A and 82B to sample and hold the radio frequency signal RF generated from the signal detector 20, first and second low pass filters 88 and 90 for integrating the output signals of the first and second switches 84 and 86, and a third comparator 92 connected to the output terminals of the first and second low pass filters 88 and 90.

In the tracking error detector 32 of FIG. 17, the first comparator 82A compares the differential radio frequency signal DRF generated from the signal detector 28 with a third reference voltage Vref3 like the third comparator 36C shown in FIG. 7 to generate a third detecting signal D3. The third detecting signal D3 has a high voltage level only at a portion where the first pit train P1 in the dual pit 22A is a mirror. The second comparator 82B compares the differential radio frequency signal DRF with a fourth reference voltage Vref4 like the fourth comparator 36D shown in FIG. 7 to generate a fourth detecting signal D4. The fourth detecting signal D4 has a low voltage level only at a portion where the second pit train P2 in the dual pit 22A is a mirror. The fourth detecting signal D4 is phase-inverted by an inverter INV connected to the output terminal of the second comparator 82B. The radio frequency signal RF generated from the signal detector 28 is applied to the first node N1 in a state (RF') having a DC component removed by the first capacitor C1 connected in a series. The first switch 84 responds to the third detecting signal D3 inputted from the first comparator 82A to sample and hold the radio frequency signal RF' inputted via the first node N1. More specifically, the first switch 84 samples the radio frequency signal RF' inputted from the first node N1 when the third detecting signal D3 is a high state and outputs the same to the first low pass filter LPF1. On the other hand, the first switch 84 holds and outputs the radio frequency signal RF' when the third detecting signal D3 is a low state. The first low pass filter 88 consisting of the first resistor R1 and the second capacitor C2 integrates an output signal of the first switch 84 and output it to the third comparator 92. In a similar manner, the second switch 86 responds to the fourth detecting signal /D4 phase-inverted and inputted from the second comparator 82B to sample and hold the radio frequency signal RF' inputted via the first node N1. More specifically, the second switch 86 samples the radio frequency signal RF' inputted from the first node N1 when the phase-inverted fourth detecting signal /D4 is a high state, and outputs the same to the second low pass filter 90. On the other hand, the second switch 86 holds and outputs the radio frequency signal RF' when the phase-inverted fourth detecting signal /D4 is a low state. The second low pass filter 90 consisting of a second resistor R2 and a second capacitor C2 integrates an output signal of the second switch 86 and outputs the same to the third comparator 92. The third comparator 92 compares output signals of the first and second low pass filters 88 and 90 to generate a tracking error signal Te.

Figure 18A:
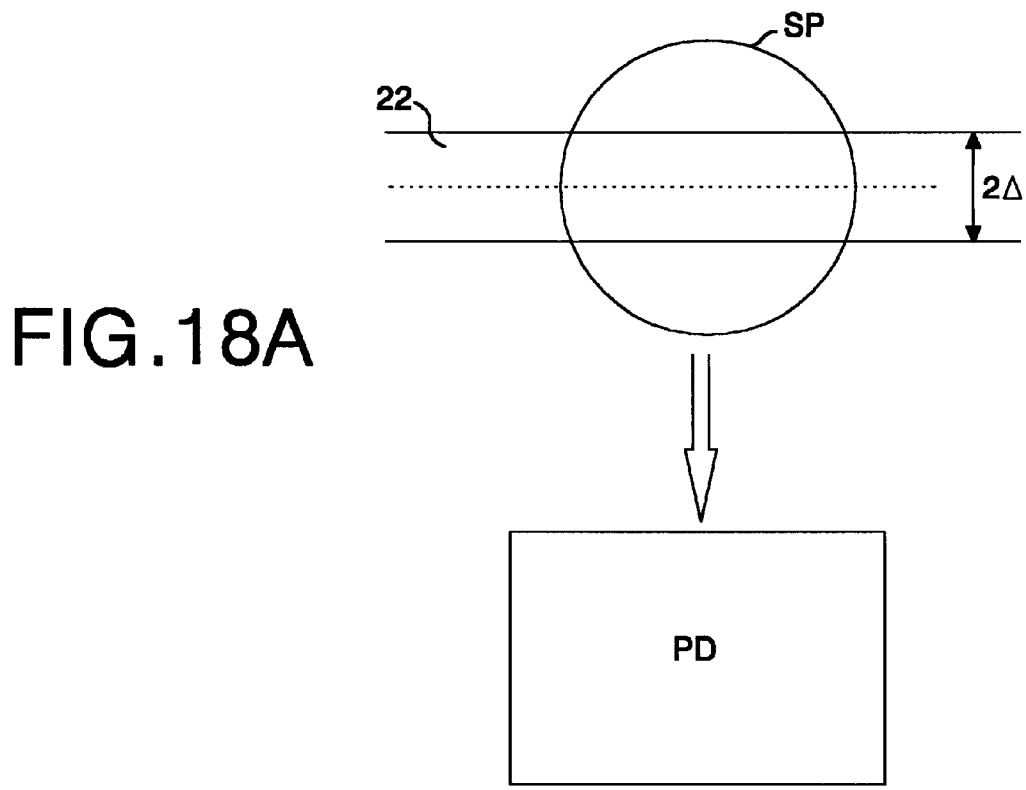
FIGS. 18A and 18B are views for explaining a condition of the pit width shown in FIG. 4.
Figure 18B:
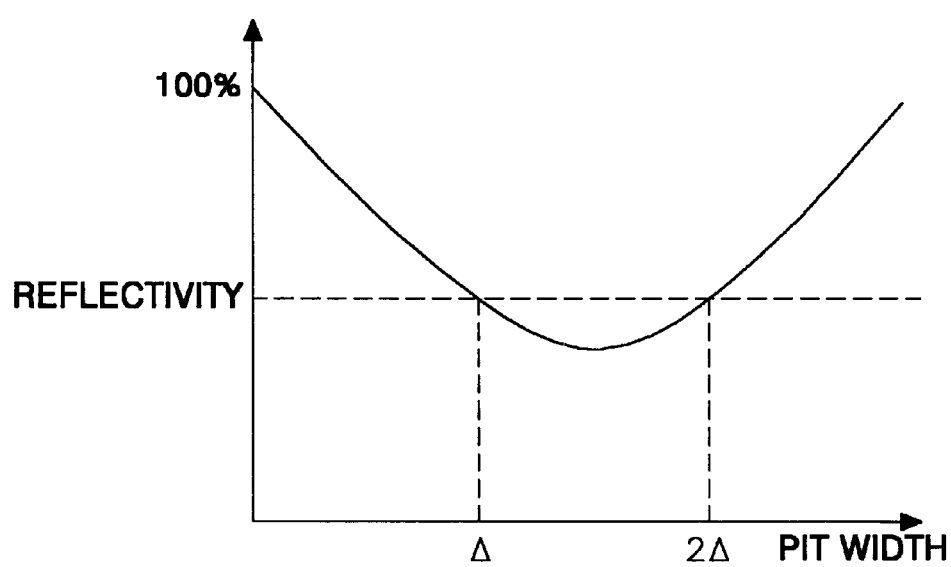

FIG. 18A to FIG. 19 shows that, when a width of the dual pit train 22 is defined into a specified value, a radio frequency signal can be obtain in the same manner as the conventional CD, etc. When a specified wavelength of light beam SP is irradiated onto the dual pit train 22 as shown in FIG. 18A, a relationship of a pit width to a reflectivity of a light beam detected by the optical detector PD. In FIG. 18B, since a light beam is full-reflected when a pit is not formed, the reflectivity of light beam appears at the highest value. On the other hand, an incident light beam SP is diffused-reflected by a portion provided with a pit when a pit is formed, so that the reflectivity decreases. It should be noted that, as a pit width of the dual pit train 22 increases from $\mathscr{A}$ into $2\mathscr{A}$, the reflectivity of a light beam decreases gradually and thereafter increases gradually. Herein, $\mathscr{A}$ represents a width of one pit train in the dual pit train 22 while $2\mathscr{A}$ does a width of the dual pit train 22. As a result, when a width ($2\mathscr{A}$) of the dual pit train 22 is set in such a manner to have the same reflectivity as the case ($\mathscr{A}$) where one pit is formed, the radio frequency RF detected by the signal detector 28 appears in a shape having two-state voltage value in similarity to the existent CD, etc. As shown in FIG. 19. Accordingly, when the total length of the dual pit 22A is formed to correspond to the existent single pit length, the radio frequency RF is level-sliced to detect a channel bit stream CBS. In this case, an optical recording medium according to the present invention can reproduce an information with a driver reproducing the existent CD, etc. On the other hand, when an information is recorded in a shape of the first and second pit trains P1 and P2, the signal processor 28 as shown in FIG. 7 is applied to detect first and second channel bit stream CBS1 and CBS2. More specifically, in the signal processor 28 shown in FIG. 7, the comparator 36 includes a first comparator 36A for level-slicing the radio frequency signal RF, and third and fourth comparators 36C and 36D for level-slicing the differential radio frequency signal DRF, thereby detecting a first detecting signal D1 and third and fourth detecting signals D3 and D4. Subsequently, the logical arithmetic unit 38 makes a logic operation of the first detecting signal D1 and the third and fourth detecting signals D3 and D4 detected from the comparator 36, to thereby detect first and second channel bit stream CBS1 and CBS2 corresponding to the first and second pit trains P1 and P2, respectively.

Figure 20:
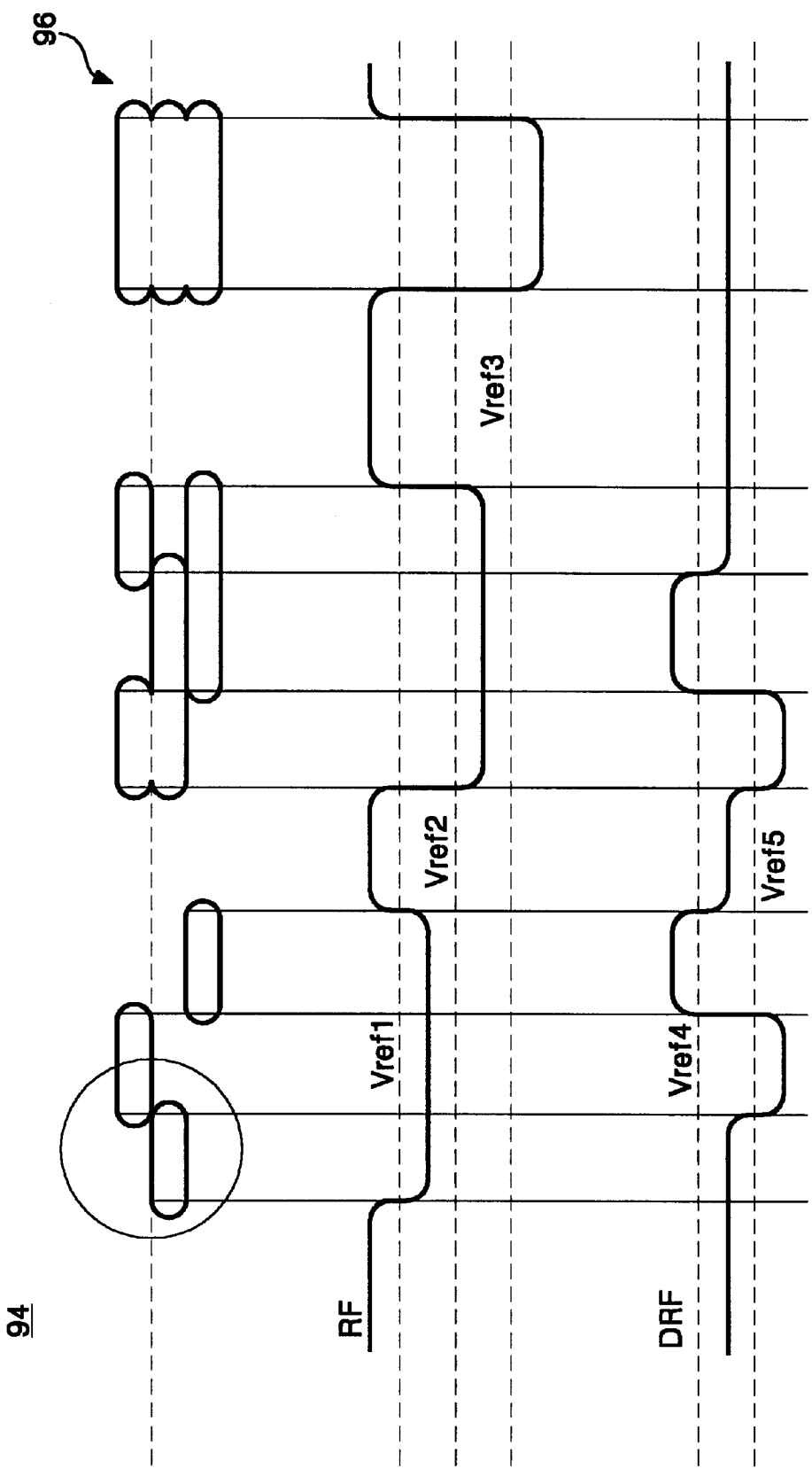
FIG. 20 shows the structure of a triple pit train defined on the optical recording medium according to another embodiment of the present invention.

FIG. 20 shows the structure of a pit train defined on an optical recording medium according to another embodiment of the present invention. The optical recording medium 94 of FIG. 20 includes a triple structure of pit train 96 arranged adjacently in the up and down positions along the track direction.

In the optical recording medium 94, the triple pit train 96 stores an information in such a manner to make a spiral or concentric circle track. A width of the triple pit train 96 arranged adjacently in the up and down side along the track direction is set to be accessed by a single light beam. Each pit train in the triple pit train 96 can be not only recorded in correspondence with an information source independent of each other, but also it can be recorded in correspondence with a single information source. Such an optical recording medium can be accessed with an optical reproducing apparatus shown in FIG. 5.

More specifically, in the optical reproducing apparatus of FIG. 5, the optical pickup 26 irradiates a reproducing beam onto the optical recording medium and detects a reflective light amount to thereby convert it into a plurality of electrical signal. In this case, the triple pit train 96 defined on the information recording face of the optical recording medium 94 is accessed by a single light beam. The signal detector 28 processes the plurality of electrical signals from the optical pickup 26 as mentioned above to detect a radio frequency signal RF and a differential radio frequency signal DRF with a fourstate voltage level as shown in FIG. 20. The signal processor 30 level-slices the radio frequency signal RF and the differential radio frequency signal DRF to convert them into a rectangular wave shape and thereafter makes a logic operation of the same to generate a channel bit stream CBS. To this end, the signal processor 30 has a detailed configuration as shown in FIG. 21.

Figure 21:
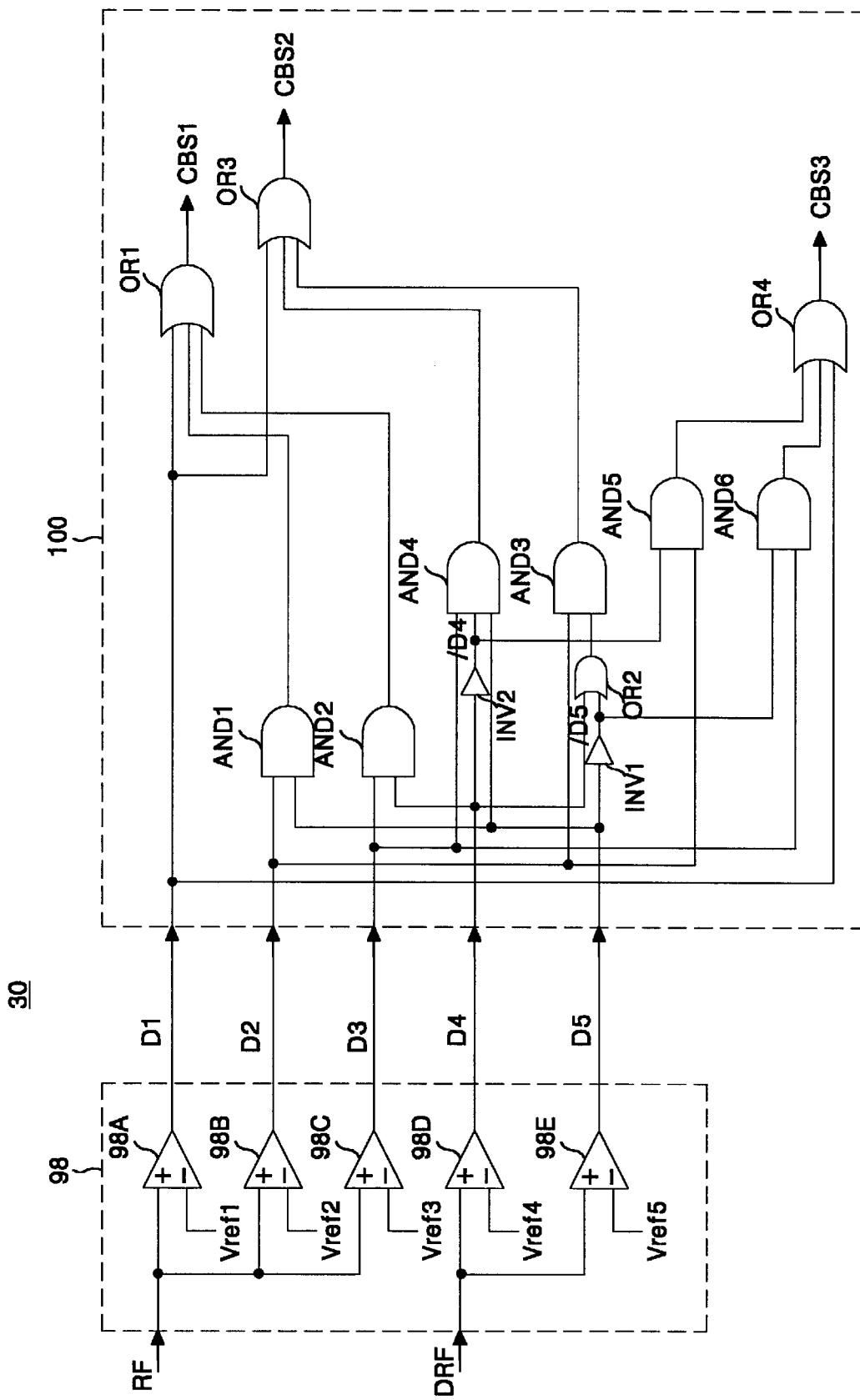
FIG. 21 is a circuit diagram of a fourth embodiment of the signal processor shown in FIG. 5.

The signal processor 30 in FIG. 21 includes a comparator 98 for level-slicing the radio frequency signal RF and the differential radio frequency signal DRF to generate rectangular wave signals, and a logical arithmetic unit 100 for making a logic operation of the rectangular wave signals inputted from the comparator 98 to generate first to third channel bit stream CBS1, CBS2 and CBS3.

Figure 22:
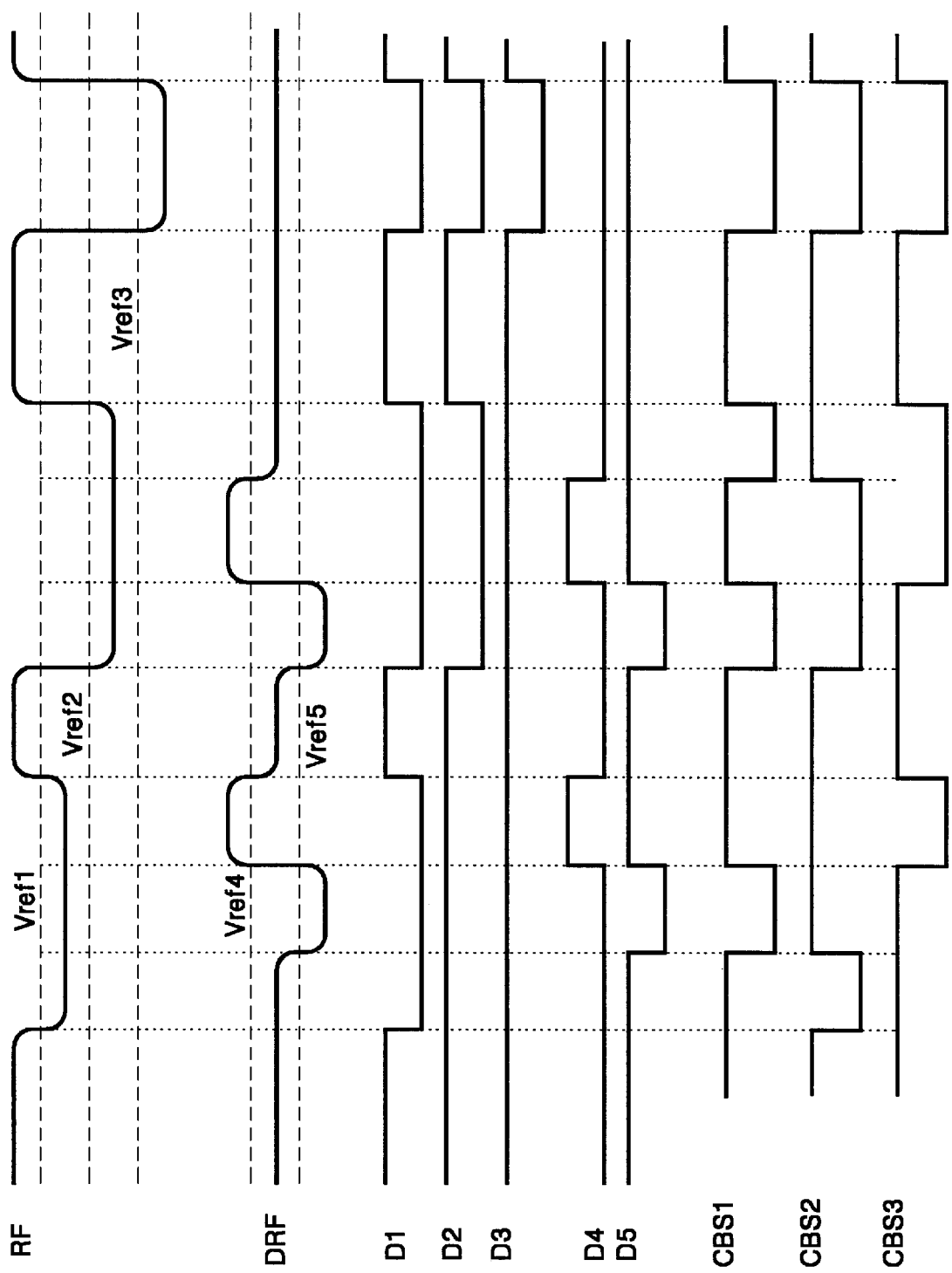
FIG. 22 is waveform diagrams representing input and output signals of each constructional element included in the signal processor shown in FIG. 21.

In FIG. 21, the comparator 98 includes first to third comparators 98A, 98B and 98C for level-slicing the radio frequency signal RF into different reference voltages, and fourth and fifth comparators 98D and 98E for level-slicing the differential radio frequency signal DRF into reference voltages. In the comparator 98, the first comparator 98A compares the radio frequency signal RF with a first reference voltage Vref1 to generate a first detecting signal D1. The first detecting signal D1 has a high voltage level when all the triple-structure pit trains 96 are mirrors. The second comparator 98B compares the radio frequency signal RF with a second reference voltage Vref2 as shown in FIG. 22 to generate a second detecting signal D2. The second detecting signal D2 has a low voltage level when at least two trains of the triple pit trains 96. The third comparator 98C compares the radio frequency signal RF with a third reference voltage Vref3 as shown in FIG. 22 to generate a third detecting signal D3. The third detecting signal D3 has a low voltage level when all the three pit trains 96 are pits. The fourth comparator 98D compares the differential radio frequency signal DRF with a fourth reference voltage Vref4 to generate a fourth detecting signal D4. The fourth detecting signal D4 has a high voltage level when a pit train at the inner circumference side in the triple-structure pit trains 96 is a mirror and a pit train at the outer circumference side is a pit. The fifth comparator 98E compares the differential radio frequency signal DRF with a fifth reference voltage Vref5 as shown in FIG. 22 to generate a fifth detecting signal D5. The fifth detecting signal D5 has a low voltage level when a pit train at the inner circumference side in the triple-structure pit trains 96 is a pit and a pit train at the outer circumference side is a mirror.

In FIG. 21, the logical arithmetic unit 100 makes a logic operation of the first to fifth detecting signals D1 to D5 inputted from the comparator 98 as given by the following Bull's algebraical expression and generates first and third channel bit stream CBS1, CBS2 and CBS3 corresponding to each pit train of the triple pit trains 96.

$$CBS1 = D1 + D2 D5 + D3 D4$$

$$CBS2 = D1 + D2(D4 + \overline{D5}) D3 \overline{D4} D5$$

$$CBS3 = D1 + D2\overline{D4} + D3\overline{D5} \qquad (2)$$

More specifically, in the logical arithmetic unit 100, the first AND gate AND1 makes a logical product operation of the second detecting signal D2 and the fourth detecting signal D4 and outputs the result. The second AND gate AND2 makes a logical product operation of the third detecting signal D3 and the fourth detecting signal D4 and outputs it. The first OR gate OR1 makes a logical sum operation of a logical product signal of the first detecting signal D1, and a logical product signal of the first AND gate and a logical product signal of the second AND gate AND2. As a result, the first OR gate OR1 generates a first channel bit stream CBS1 corresponding to a pit train at the inner circumference side in the triple pit trains 96 as shown in FIG. 22. The second OR gate OR2 makes a logical sum operation of the fourth detecting signal D4 and the fifth detecting signal /D5 phase-inverted by the first inverter INV1 and outputs the result. The third AND gate AND3 makes a logical product operation of the second detecting signal D2 and a logical sum signal of the second OR gate OR2 and outputs the result. The fourth AND gate AND4 makes a logical product operation makes a logical product operation of the fourth detecting signal D4 phase-inverted by a second inverter INV2, the third detecting signal D3 and the fifth detecting signal D5 and outputs the result. The third OR gate OR3 makes a logical sum operation of the first detecting signal D1, the logical product signal of the third AND gate AND3 and the logical product signal of the fourth AND gate AND4 and outputs the result. As a result, the third OR gate OR3 generates a second channel bit stream CBS2 corresponding to a pit train at the center of the triple pit train 96 as shown in FIG. 22. The fifth AND gate AND5 makes a logical product operation of the second detecting signal D2 and the phase-inverted fourth detecting signal /D4 and outputs the result. The sixth AND gate AND6 makes a logical product operation of the third detecting signal D3 and the phase-inverted fifth detecting signal /D5 and outputs the result. The fourth OR gate OR4 makes a logical sum operation of the first detecting signal D1, the logical product signal of the fifth AND gate AND5 and the logical product signal of the sixth AND gate AND6 and outputs the result. As a result, the fourth OR gate OR4 generates a third channel bit stream CBS3 corresponding to a pit train at the outer circumference side of the triple pit trains 96 as shown in FIG. 22. As described above, the signal processor 30 simultaneously detects first to third channel bit stream CBS1, CBS2 and CBS3 corresponding to each pit train of the triple pit trains 98.

Meanwhile a method of reproducing an information by irradiating a single light beam onto at least two adjacent tracks as mentioned above is applicable to a method of reproducing an information at a high density making use of a light source with a relatively long wavelength. An information recorded with a narrow track pitch in correspondence with a short wavelength of light source (i.e., a blue laser) using the above-mentioned optical reproducing method can be reproduced by utilizing a long wavelength of light source (i.e., red laser).

Figure 23:
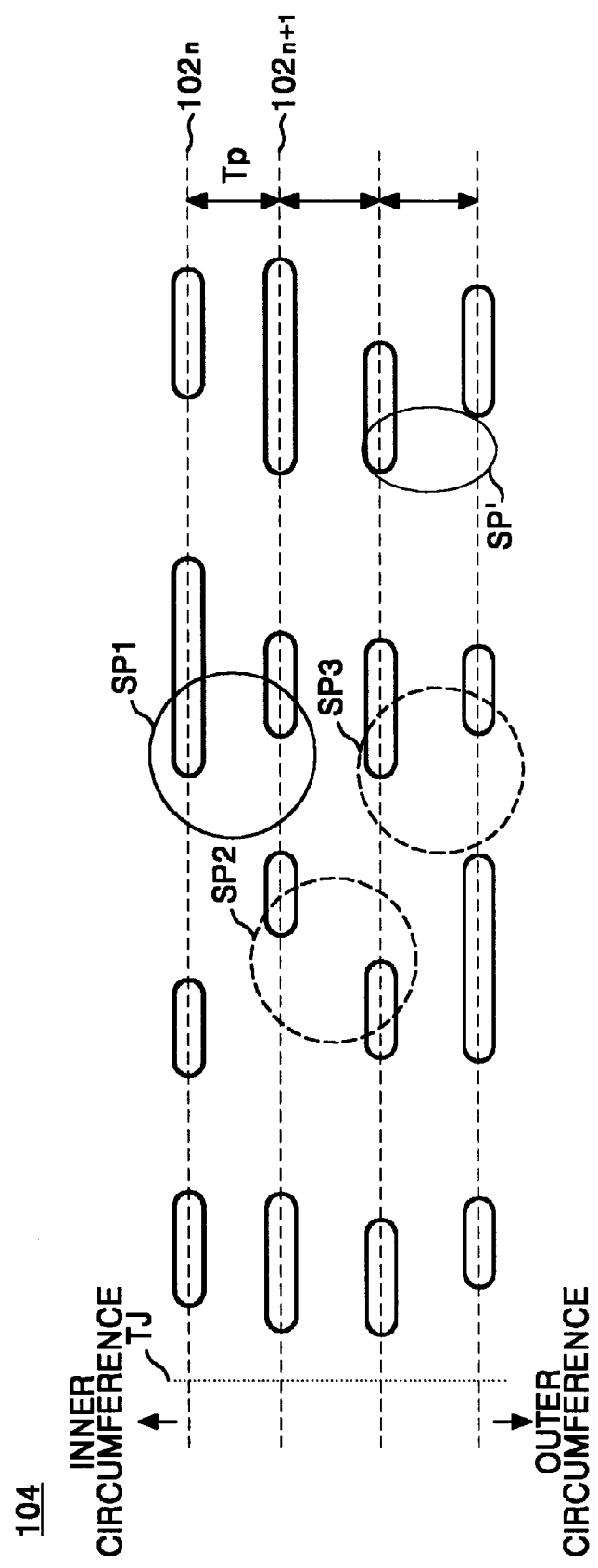
FIG. 23 shows a relationship of a reproducing beam to a track structure of a read-only type, high density optical recording medium.

Referring now to FIG. 23, there is shown a high density track structure applied to the conventional read-only type CD and DVD, etc. It should be noted that, in an optical recording medium 104 shown in FIG. 23, a certain of two adjacent tracks 102n and 102n+1 has been set to have such a small track pitch Tp that it can be simultaneously accessed by a single reproducing beam SP1. For instance, when a long wavelength of light source is irradiated onto set to have a narrow track pitch in correspondence with a short wavelength of light source by a reproducing beam, a relationship of a light spot to the track as described above can be made. Accordingly, pit trains defined on each of the two adjacent tracks 102n and 102n+1 is simultaneously accessed by a single reproducing beam SP1. In this case, as a method of reproducing a pit train information recorded on each of two adjacent tracks 102n and 102n+1, a method of using only the first channel or the second channel corresponding to each track 102n and 102n+1; and a method of using all the first and second channels can be considered.

First, when only an information of the first channel or the second channel is used for an information reproduction of the first and second channels, a reproducing beam irradiated onto a spiral track is irradiated in such a manner to trace a boundary surface between the adjacent tracks. In this case, the reproducing beam progresses from the inner circumference track into the outer circumference track, without a track jump, in a sequence of first, second and third reproducing beams SP1, SP2 and SP3 shown in FIG. 23. only an information of the first channel or the second channel in an information reproduced by such reproducing beams SP1, SP2 and SP3 is detected, so that information of the first and second channels can be reproduced continuously in a time. On the other hand, when all the information of two channel is used for the information reproduction of the first and second channels, the reproducing beam progresses in a sequence of the first and third reproduce beams SP1 and SP3 shown in FIG. 23. In this case, the reproducing beam SP1 or SP3 is irradiated in such a manner to jump one track from the track jump line TJP every one track rotation and trace a boundary surface between the adjacent tracks. A single channel information in the information of the first and second channels picked up at the same time by such a reproducing beam SP1 or SP3 is stored to a memory in the one track rotation unit and thereafter is multiplexed, so that the information of the first and second channels arranged in a time sequence can be reproduced at twice speed.

Also, since a resolution is improved when a light spot SP with a super resolution in the track direction (i.e., tangential direction) as shown in FIG. 23 is used as a reproducing beam, relatively small pits can be read out although a long wavelength of light source is employed. Such a super resolution beam spot can be implemented by a known technique disclosed in the U.S. Pat. No. 5,600,620.

Figure 24:
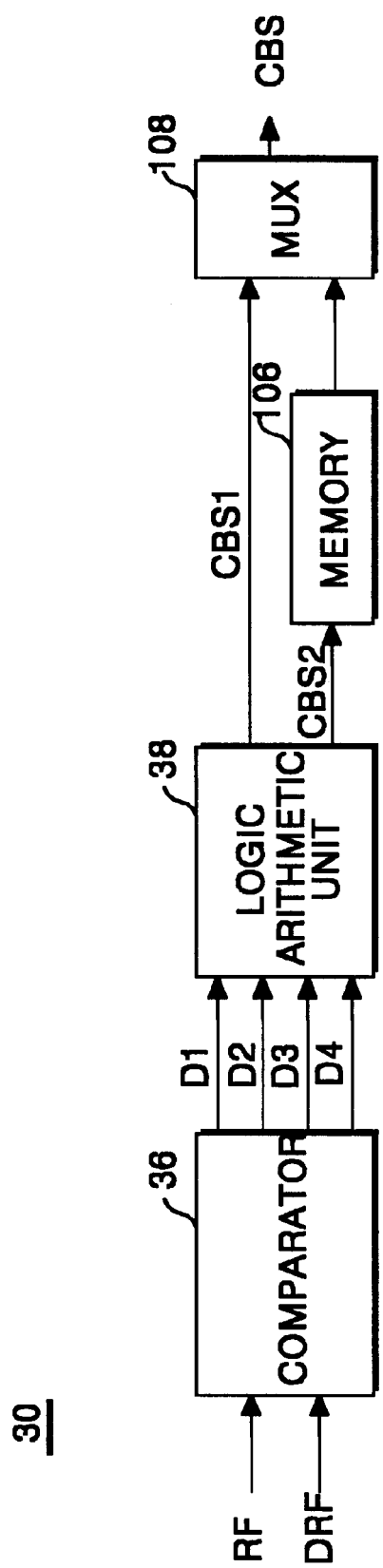
FIG. 24 shows another embodiment of the signal processor when the optical recording medium of FIG. 23 is reproduced by the optical reproducing apparatus of FIG. 5.

An optical recording medium having such a high density track structure can be accessed by the optical reproducing apparatus shown in FIG. 5. In FIG. 5, the optical pickup 26 irradiates a reproducing beam onto the information recording face of the optical recording medium 104 and detects a reflective beam amount to thereby convert it into a plurality of electrical signals. In this case, the first and second pit trains defined on the two adjacent tracks are accessed by a single light beam. The signal processor 28 processes the plurality of electrical signals inputted from the optical pickup 26 as mentioned above to detect the radio frequency signal RF and the differential radio frequency signal DRF having a four-state voltage level. The signal processor 30 level-slices each of the radio frequency signal RF and the differential radio frequency signal DRF inputted from the signal detector 28 to convert it into a rectangular wave shape and thereafter makes a logic operation of the same, thereby generating a channel bit stream CBS. To this end, the signal processor 30 has a configuration as shown in FIG. 7. An explanation as to such a configuration will be omitted. When only an information of the first channel or the second channel is used for information reproduction of the first and second channels, only any one of the first and second channel bit stream CBS1 and CBS2 is outputted from the signal processor 30 of FIG. 7 and then reconstructed. On the other hand, when all the information of the first and second channels are used for information reproduction of the first and second channels, the signal processor 30 further includes a memory 106 and a multiplexor 108 as shown in FIG. 24. In FIG. 24, the memory 106 stores the second channel bit stream CBS2 from the logical arithmetic unit 38 in a certain unit (i.e., one track rotation unit) The multiplexor 108 selectively outputs the first channel bit stream CBS1 of the logical arithmetic unit 38 and the second channel bit stream CBS2 of the memory 106 alternately every desired period (i.e., one track rotation unit). Accordingly, the channel bit stream CBS having the first and second channel bit stream CBS1 and CBS2 arranged in a time sequence can be outputted and reconstructed.

Figure 25:
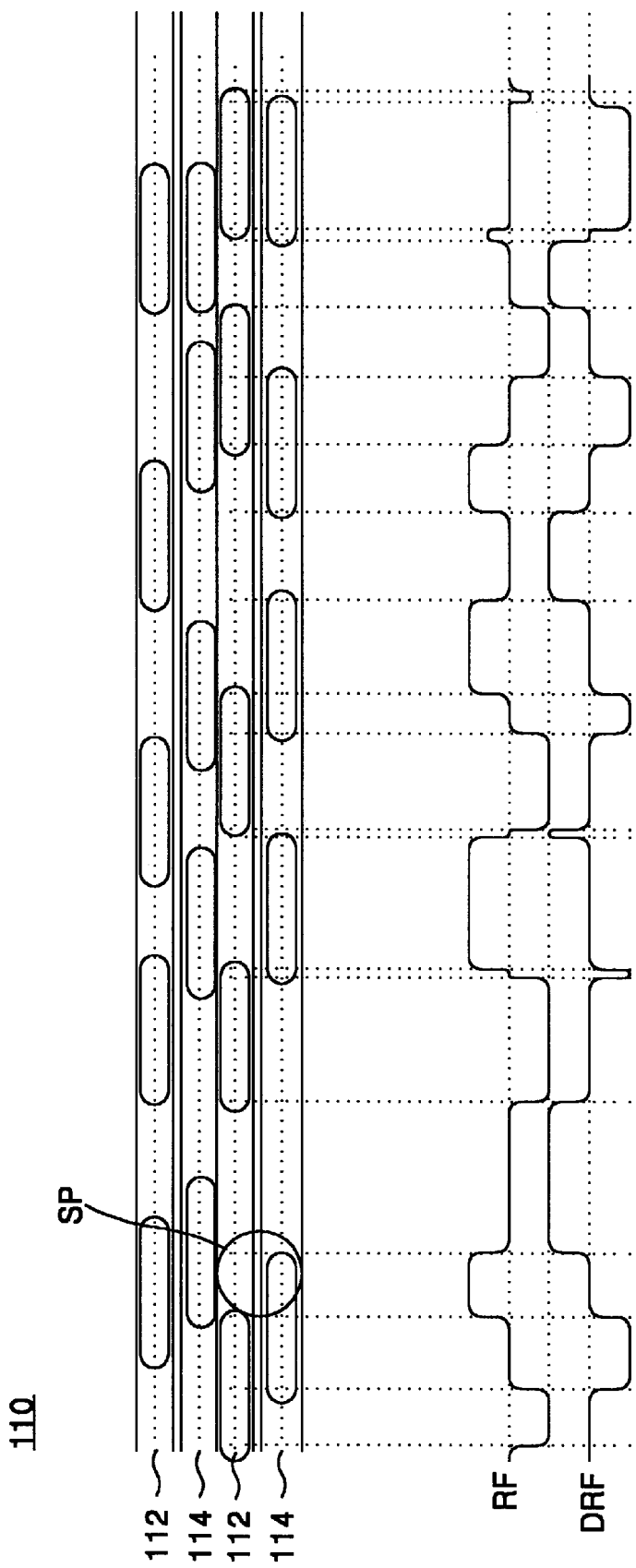
FIG. 25 shows a relationship of a reproducing beam to a recordable high density optical recording medium and signal waveforms detected by the reproducing beam.

Referring to FIG. 25, there are shown a high density track structure applied to the conventional recordable optical recording medium and signal waveforms detected by a reproducing beam. It should be noted that, in an optical recording medium 110 shown in FIG. 25, adjacent land and groove tracks 112 and 114 are set to have such a small track pitch that they can be simultaneously accessed by a single reproducing beam SP. Accordingly, pit trains defined on the adjacent land and groove tracks 112 and 114 are simultaneously accessed by a single reproducing beam SP. In this case, two method, that is, a method of using only an information of the first channel or the second channel recorded on each of the adjacent land and groove tracks 112 and 114 and a method of using all the information of the first and second channels can be considered. When only any one of the first and second channel information, the reproducing information SP is moved, without a track jump, in a sequence of a boundary surface between the land and the groove, a boundary surface between the groove and the land, a boundary surface between the land and the groove and so on with tracing a boundary surface of the land and groove tracks. Only an information of the first channel or the second channel in the information reproduced by such a reproducing beam is detected, so that the information of the first and second channels recorded in a sequence of the land and groove tracks 112 and 114 can be reproduced continuously in a time. On the other hand, when all the information of the first and second channels are used, the reproducing beam SP jumps one track every one track rotation and is irradiated in such a manner to trace the boundary surface between the land and the groove. One channel information in the information of the first and second channels picked up at the same time by such a reproducing beam is stored in a memory in a certain unit (i.e., one track rotation unit) and thereafter multiplexed, so that the information of the first and second channels arranged in a time sequence can be reproduced. In this case, it has an advantage in that twice-speed reproduction becomes possible.

The information recorded on the high density land and groove tracks 112 and 114 in this manner is reproduced by an optical reproducing apparatus shown in FIG. 5 as described above. In FIG. 5, the optical pickup 26 irradiates a reproducing beam along the boundary surfaces of the land and groove and detects a reflective light amount to thereby convert the same into a plurality of electrical signals. The signal detector 28 adds and amplifies the electrical signals from the optical pickup 26 to detect a radio frequency signal RF as shown in FIG. 25. Also, the signal detector 28 differentially amplifies the electrical signals from the optical pickup 26 to generate a differential radio frequency signal DRF as shown in FIG. 25. In this case, the radio frequency signal RF and the differential radio frequency signal DRF detected from the signal detector 28 has an inversive phase with respect to the radio frequency signal and the differential radio frequency signal detected at the above-mentioned read-only type optical recording medium. This results from light amounts reflected from the land and groove tracks being opposite to each other. Accordingly, the radio frequency signal RF is inputted from the signal processor 30 shown in FIG. 7 to the third and fourth comparators 36C and 36D, the differential radio frequency signal DRF is inputted to the first and second comparators 36A and 36B. The signal processor 30 processes the radio frequency signal RF and the differential radio frequency signal DRF as mentioned above to detect the first and second channel bit stream CBS1 and CBS2.

As described above, in an optical recording medium according to the present invention, at least two pit trains are arranged adjacently at the up and down positions such that it can be reproduced by a single light beam, thereby increasing the recording density into at least twice. Also, when an information is stored in a dual pit shape, it has an advantage in that a total length of the dual pit is formed in correspondence with a single pit length to have a changeability with the existent optical recording medium such as CD and DVD, etc., so that an information reproduction is possible at the same driver. Furthermore, in a reproducing method and apparatus of an optical recording medium according to the present invention, an information recorded in a pit train shape arranged adjacently at least more than two can be simultaneously reproduced by irradiating a single light beam. Moreover, an optical reproducing apparatus and method according to the present invention is capable of reproducing a responsible information from an optical recording medium having a track pitch set relatively narrowly compared with a specified wavelength of light beam. Accordingly, a track pitch of the optical recording medium is set to have a smaller value than the conventional track pitch corresponding to a laser diode with a specified wavelength, so that the recording density can be dramatically improved. Also, it becomes possible to reproduce an optical recording medium having a track pitch suitable for a short wavelength (i.e., blue color) using a long wavelength of laser diode.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical recording medium suitable for recording and reproducing an information by irradiating a light beam onto it, comprising:
   a substrate; and
   an information recording face having an information recorded as pit trains and including a track having any one of a concentric circle and spiral shape,
   wherein at least two pit trains are arranged adjacently in such a manner to be reproduced by a single light beam,
   wherein said at least two pit trains include a first pit train corresponding to a first information and a second pit train corresponding to a second information, and
   wherein the first information and the second information are information time-divided from a single information source.

2. The optical recording medium as claimed in claim 1, wherein the first information and the second information correspond to an independent information source.

3. The optical recording medium as claimed in claim 1, wherein a total length of the first and second pits constructing said first and second pit trains is recorded in correspondence with the first information as a single recording mark.

4. The optical recording medium as claimed in claim 1, wherein the number of said pit trains arranged adjacently is three, the three pit trains are recorded in correspondence with a single information source.

5. The optical recording medium as claimed in claim 1, wherein the number of said pit trains arranged adjacently is three, each of the three pit trains is recorded in correspondence with an independent information source.

6. The optical recording medium as claimed in claim 1, wherein the information recording face is a recording layer that can record a user information.

7. The optical recording medium as claimed in claim 6, wherein the recording layer is a phase-change recording layer.

8. The optical recording medium as claimed in claim 6, wherein the recording layer is an opto-magnetic recording layer.

9. An optical reproducing method, comprising the steps of:
   (A) irradiating a single light beam onto at least two tracks with respect to an optical recording medium having a track in which an information is recorded as pit trains;
   (B) detecting and converting a reflective light from the optical recording medium using a photo-detector divided into a plurality number, and combining the converted light detecting signals to thereby detect a plurality of radio frequency signals; and
   (C) processing the plurality of radio frequency signals to detect information corresponding to each of said at least two tracks,
   wherein said optical recording medium has a track formed in correspondence with a short wavelength of light source, and reproduced by a long wavelength of light source.

10. The optical reproducing method as claimed in claim 9, wherein said step (B) includes
    (B1) adding and amplifying the photo-detecting signals to generate a radio frequency signal; and
    (B2) differentially amplifying a photo-detecting signal corresponding to a light amount reflected at the inner circumference side of the optical recording medium from a photo-detecting signal corresponding to a light amount reflected at the outer circumference side thereof in the photo detecting signals to generate a differential radio frequency signal.

11. The optical reproducing method as claimed in claim 10, further comprising the step of:
    (D) detecting a tracking error signal making use of the radio frequency signal and the differential radio frequency signal and performing a tracking servo.

12. The optical reproducing method as claimed in claim 9, wherein said optical recording medium includes an information recording face having an information recorded as pit trains and including a track having any one of a concentric circle and spiral shape, and
    wherein at least two pit trains are arranged adjacently in such a manner to be reproduced by a single light beam.

13. The optical reproducing method as claimed in claim 9, wherein said step (C) includes
    (C1) level-slicing the plurality of radio frequency signals into different reference voltages to generate rectangular wave signals; and
    (C2) making a logic operation of the rectangular wave signals to detect the information.

14. The optical reproducing method as claimed in claim 9, wherein said step (C) includes
    (C3) detecting a sum signal and a difference signal of the plurality of radio frequency signals; and
    (C4) zero-crossing each of the sum signal and the difference signal to detect the information.

15. The optical reproducing method as claimed in claim 9, wherein said information is detected simultaneously.

16. The optical reproducing method as claimed in claim 9, wherein only an information corresponding to any one track in said information is detected by a selection of user.

17. The optical reproducing method as claimed in claim 9, wherein when said information is time-divided from a single information source, the information is selectively detected alternately every certain period.

18. The optical reproducing method as claimed in claim 9, wherein when said pits recorded on each of said at least two tracks are recorded such that a total length summing the adjacent pits in the radial direction at the tracks, an information corresponding to said total length is detected.

19. The optical reproducing method as claimed in claim 9, wherein only an information corresponding to any one of said at least two tracks is detected by tracing said light beam along said at least two tracks.

20. The optical reproducing method as claimed in claim 9, wherein an information corresponding to each of said two tracks is detected by allowing said light beam to be traced along at least two tracks while being jumping every one track rotation.

21. The optical reproducing method as claimed in claim 9, wherein said information continued in a time in accordance with a sequence of track is detected by delaying an information corresponding to a single track by the one track rotation time when said information corresponds to two tracks and thereafter multiplexing it with an information corresponding to a single track.

22. An optical reproducing apparatus, comprising:

light beam generating means for irradiating a single light beam onto at least two tracks with respect to an optical recording medium having a track in which an information is recorded as pit trains;

signal detecting means for dividing a light reflected from the optical recording medium into a plurality number and detecting and converting the same, and combining the converted light detecting signals to thereby detect a plurality of radio frequency signals; and means for processing the plurality of radio frequency signals to detect information corresponding to each of said at least two tracks, wherein said optical recording medium has a track formed in correspondence with a short wavelength of light source, and reproduced by a long wavelength of light source.

23. The optical reproducing apparatus as claimed in claim 22, wherein said signal detecting means includes means for adding and amplifying the photo-detecting signals to generate a radio frequency signal; and means for differentially amplifying a photo detecting signal corresponding to a light amount reflected at the inner circumference side of the optical recording medium from a photo detecting signal corresponding to a light amount reflected at the outer circumference side thereof in the light detecting signals to generate a differential radio frequency signal.

24. The optical reproducing apparatus as claimed in claim 23, further comprising:

means for detecting a tracking error signal making use of the radio frequency signal and the differential radio frequency signal; and tracking servo means for responding to the tracking error signal to perform a tracking servo.

25. The optical reproducing apparatus as claimed in claim 22, wherein said optical recording medium includes an information recording face having an information recorded as pit trains and including a track having any one of a concentric circle and spiral shape, and wherein at least two pit trains are arranged adjacently in such a manner to be reproduced by a single light beam.

26. The optical reproducing apparatus as claimed in claim 22, wherein said signal processing means includes means for level-slicing the plurality of radio frequency signals into different reference voltages to generate rectangular wave signals; and means for making a logic operation of the rectangular wave signals to detect the information.

27. The optical reproducing apparatus as claimed in claim 22, wherein said signal processing means includes adder means for detecting a sum signal of the plurality of radio frequency signals; and subtracting means for detecting a difference signal of the plurality of radio frequency signals; and means for zero-crossing each of the sum signal and the difference signal to detect the information.

28. The optical reproducing apparatus as claimed in claim 22, wherein said signal processing means detects said information simultaneously.

29. The optical reproducing apparatus as claimed in claim 22, wherein said signal processing means detects only an information corresponding to any one track in said information by a selection of user.

30. The optical reproducing apparatus as claimed in claim 22, wherein said signal processing means selectively detects the information alternately every certain period when said information is time-divided from a single information source.

31. The optical reproducing apparatus as claimed in claim 22, wherein, when said pits recorded on each of said at least two tracks are recorded such that a total length summing the adjacent pits in the radial direction at the tracks, said signal processing means detects an information corresponding to said total length.

32. The optical reproducing apparatus as claimed in claim 22, wherein only an information corresponding to any one of said at least two tracks is detected by tracing said light beam along said at least two tracks.

33. The optical reproducing apparatus as claimed in claim 22, wherein an information corresponding to each of said two tracks is detected by allowing said light beam to be traced along at least two tracks while being jumping every one track rotation.

34. The optical reproducing apparatus as claimed in claim 22, wherein said information continued in a time in accordance with a sequence of track is detected by delaying an information corresponding to a single track by the one track rotation time when said information corresponds to two tracks and thereafter multiplexing it with an information corresponding to a single track.

* * * * *